May 21, 1935.  C. M. YODER  2,001,757
APPARATUS FOR AND PROCESS OF MAKING CYLINDRICAL BODIES
Filed Oct. 4, 1930  16 Sheets-Sheet 5
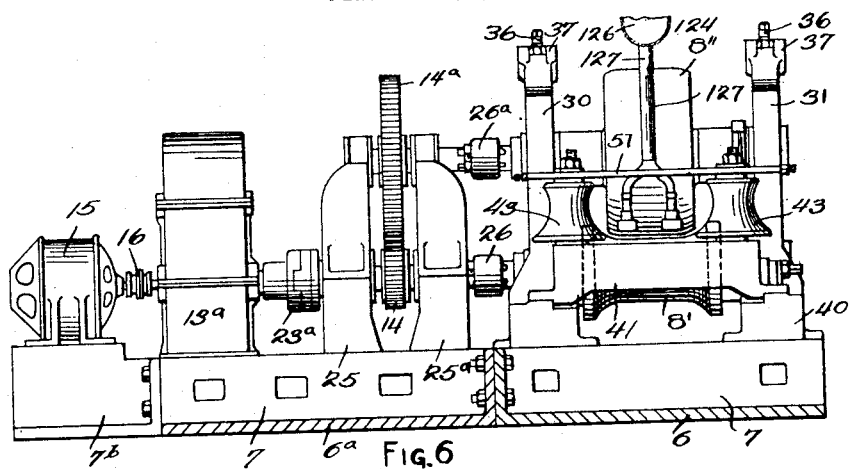
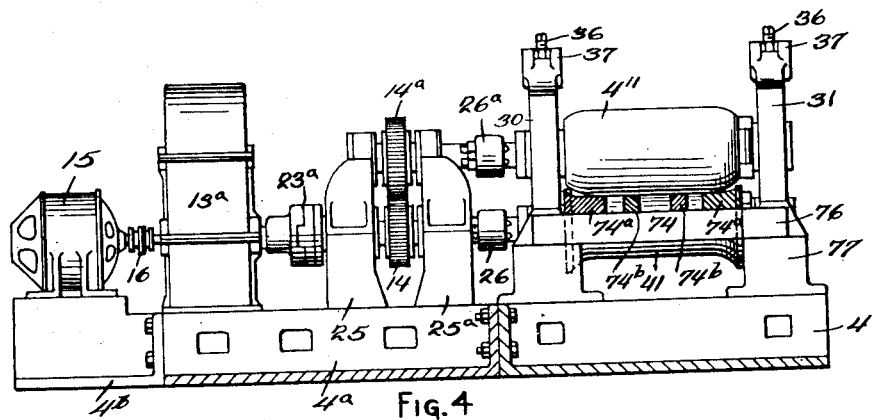
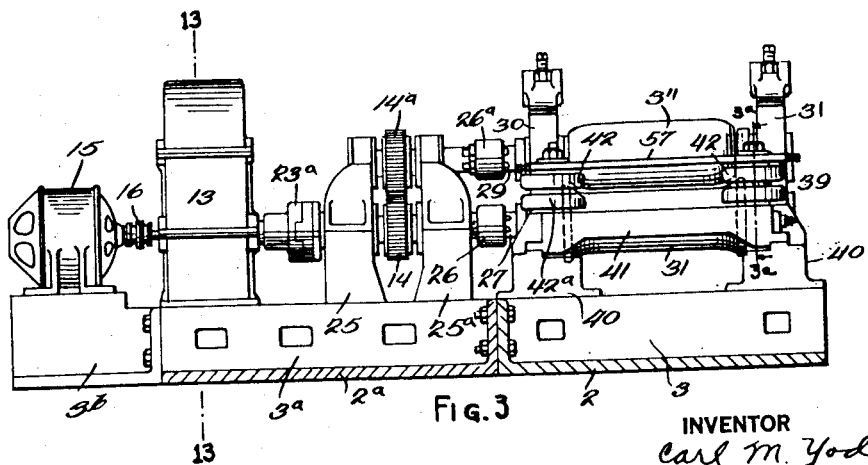
INVENTOR
Carl M. Yoder
BY
Geo. B Pitts
ATTORNEY May 21, 1935.  C. M. YODER  2,001,757
APPARATUS FOR AND PROCESS OF MAKING CYLINDRICAL BODIES
Filed Oct. 4, 1930  16 Sheets-Sheet 7

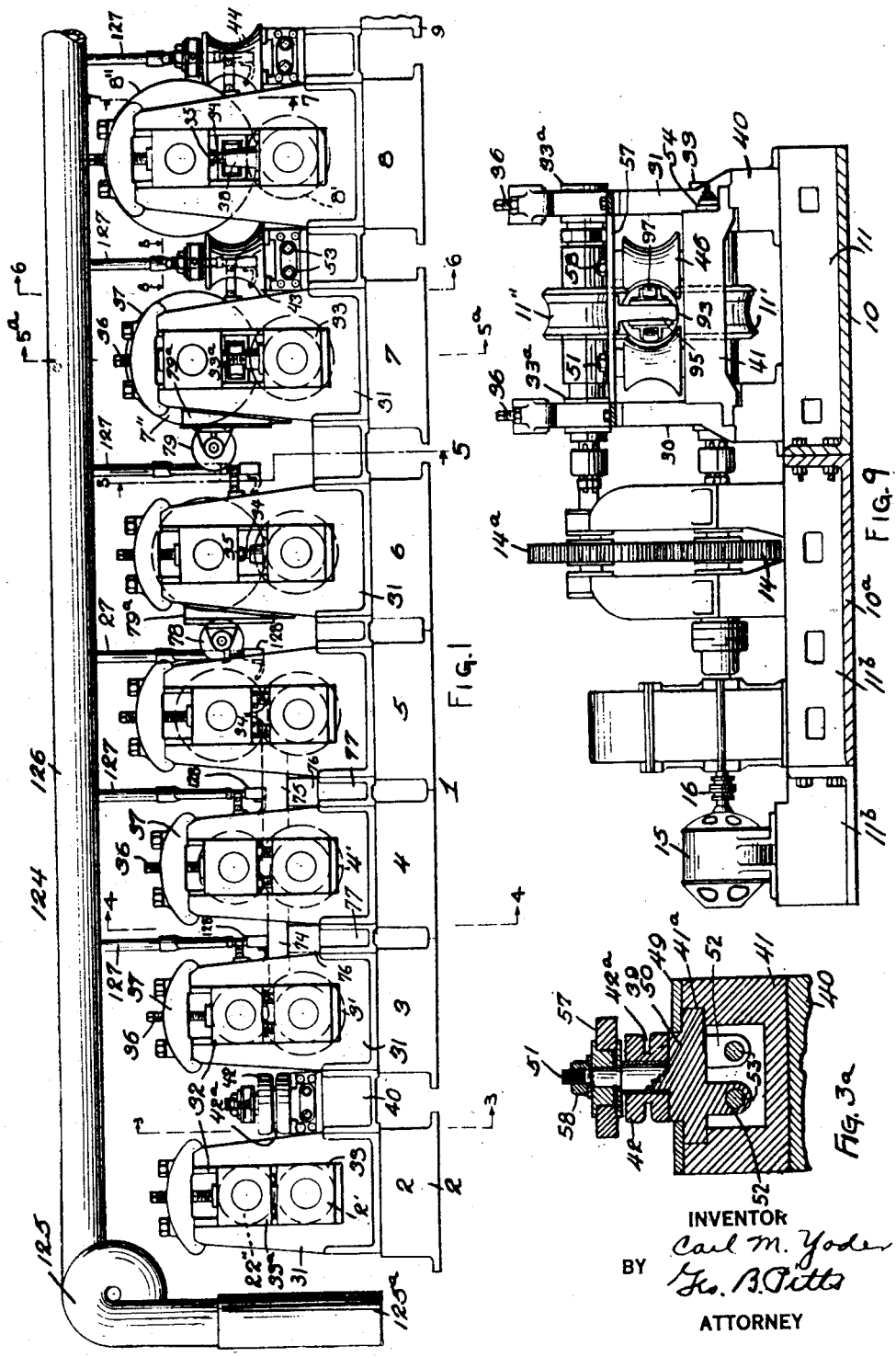

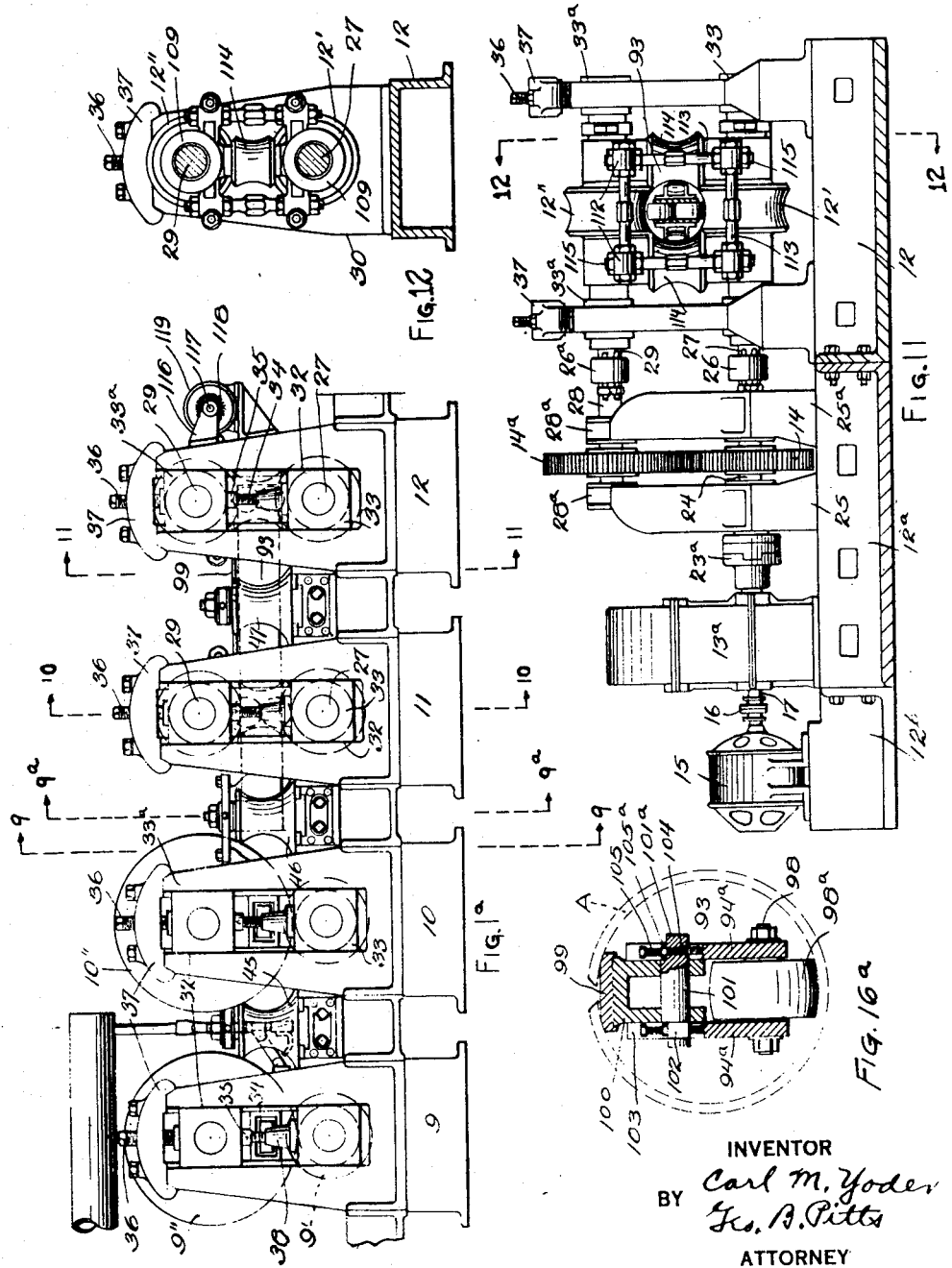

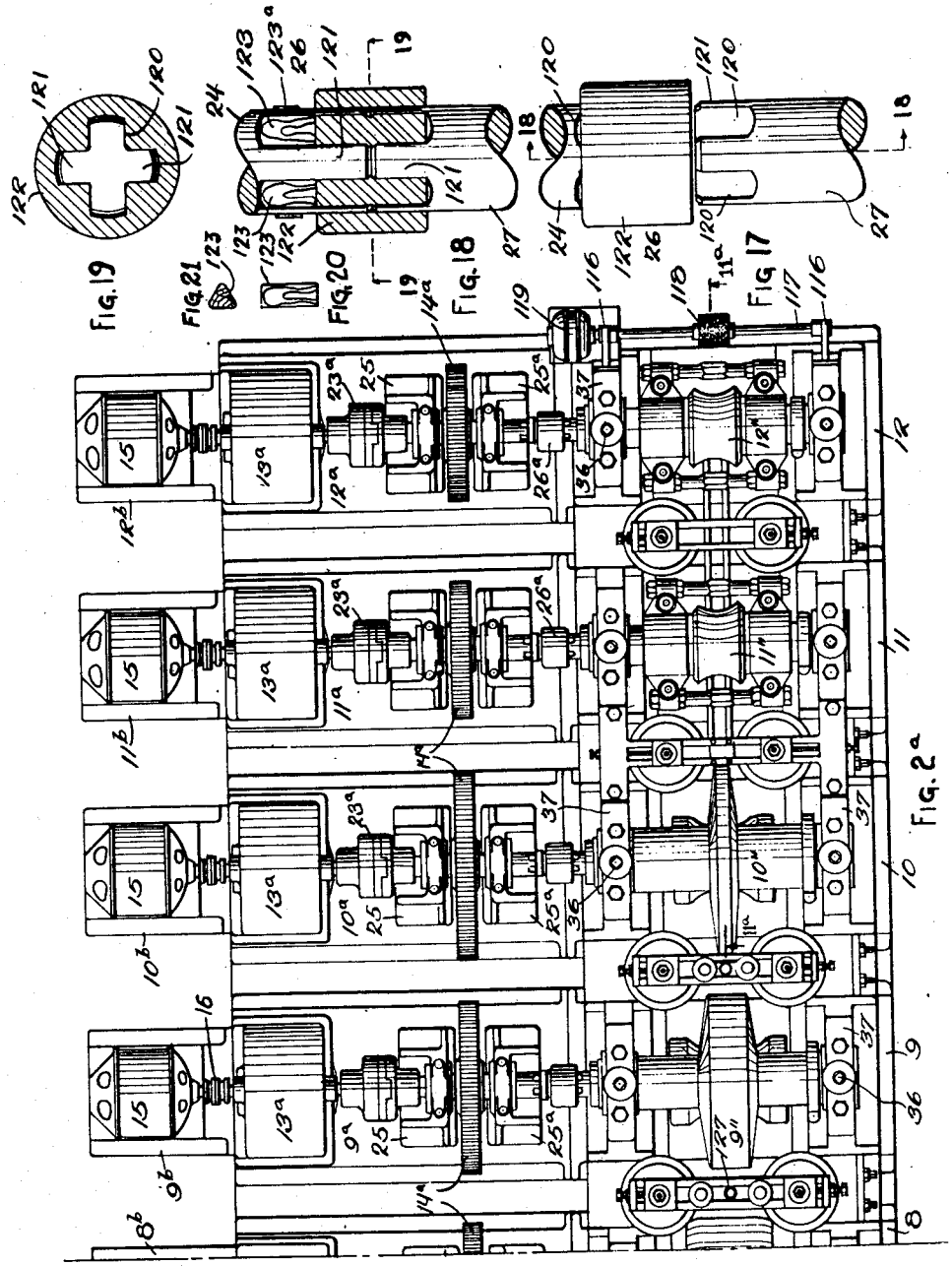

INVENTOR
Carl M. Yoder
BY Geo. B. Pitts
ATTORNEY

May 21, 1935.　　C. M. YODER　　2,001,757

APPARATUS FOR AND PROCESS OF MAKING CYLINDRICAL BODIES

Filed Oct. 4, 1930　　16 Sheets-Sheet 8

INVENTOR
Carl M. Yoder
BY Geo. B. Pitts
ATTORNEY

May 21, 1935.   C. M. YODER   2,001,757
APPARATUS FOR AND PROCESS OF MAKING CYLINDRICAL BODIES
Filed Oct. 4, 1930   16 Sheets-Sheet 9

INVENTOR
Carl M. Yoder
BY Geo. B. Pitts
ATTORNEY

May 21, 1935.　　　　C. M. YODER　　　　2,001,757
APPARATUS FOR AND PROCESS OF MAKING CYLINDRICAL BODIES
Filed Oct. 4, 1930　　16 Sheets-Sheet 10
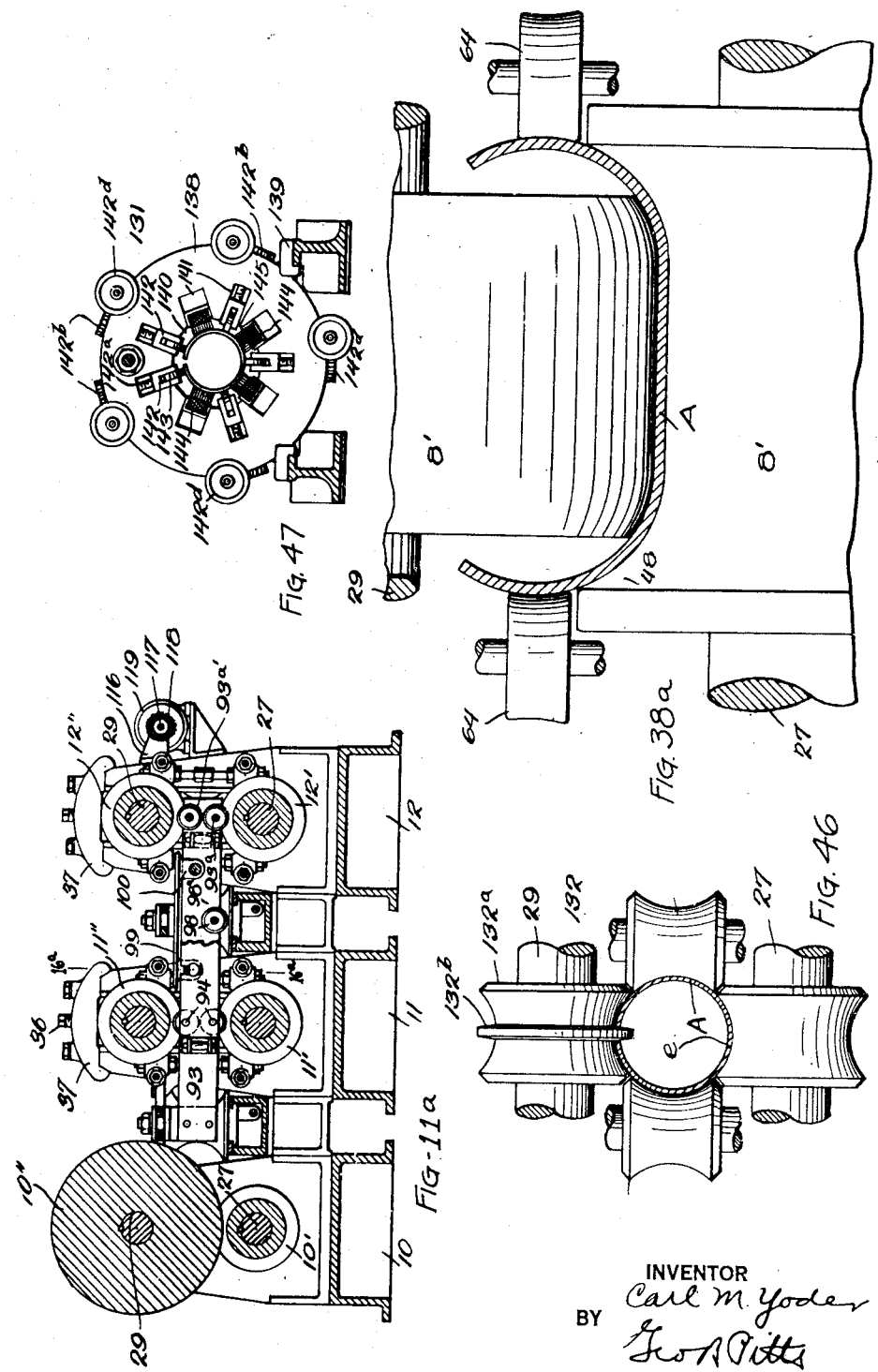
INVENTOR
Carl M. Yoder
BY
Geo A Pitts
ATTORNEY

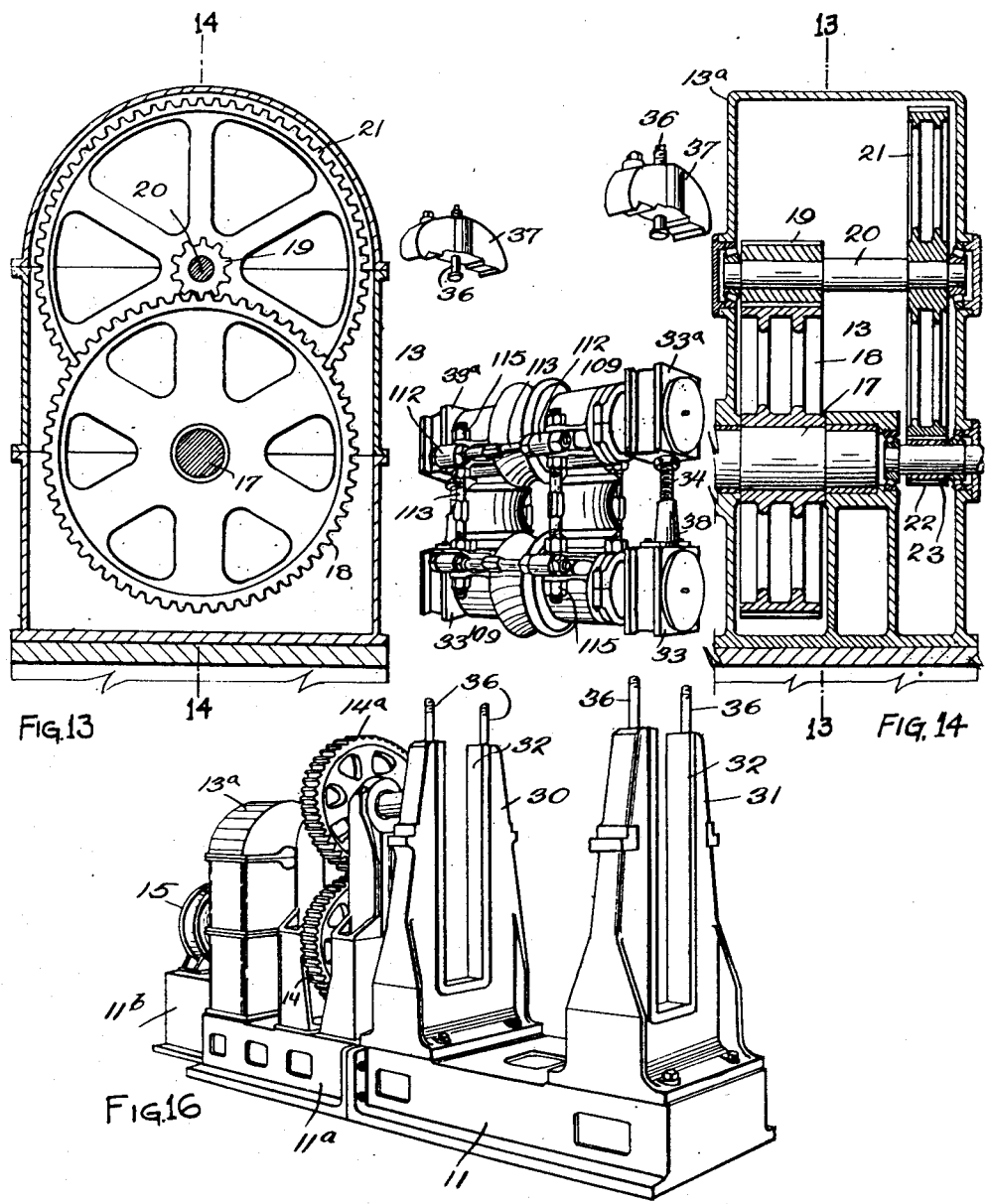

May 21, 1935.  C. M. YODER  2,001,757
APPARATUS FOR AND PROCESS OF MAKING CYLINDRICAL BODIES
Filed Oct. 4, 1930   16 Sheets-Sheet 12

INVENTOR
Carl M. Yoder
BY Geo. B. Pitts
ATTORNEY

May 21, 1935.  C. M. YODER  2,001,757
APPARATUS FOR AND PROCESS OF MAKING CYLINDRICAL BODIES
Filed Oct. 4, 1930   16 Sheets-Sheet 13
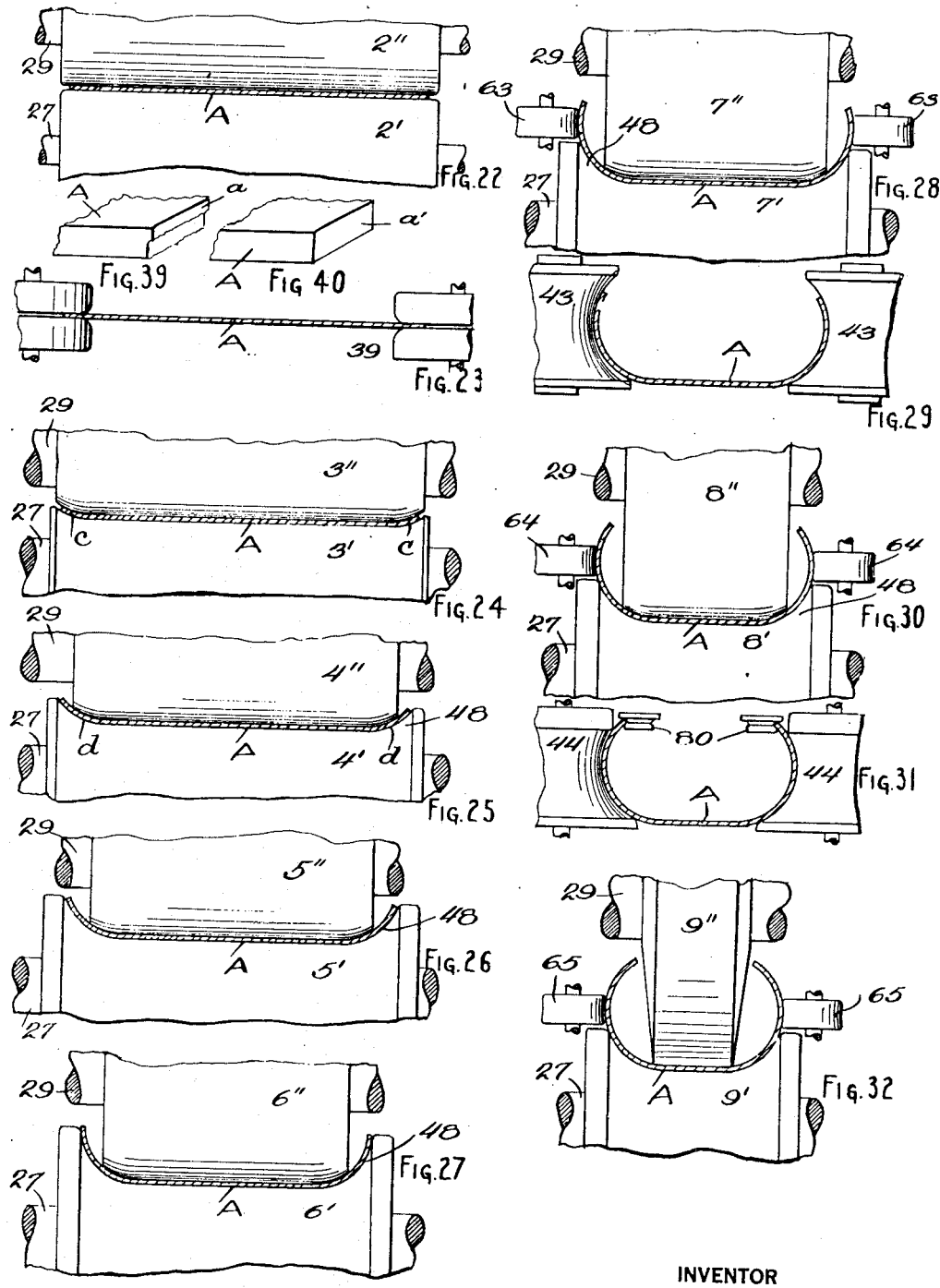

May 21, 1935. C. M. YODER 2,001,757

APPARATUS FOR AND PROCESS OF MAKING CYLINDRICAL BODIES

Filed Oct. 4, 1930 16 Sheets-Sheet 14

INVENTOR
Carl M. Yoder
BY Geo. B. Pitts
ATTORNEY

May 21, 1935.  C. M. YODER  2,001,757
APPARATUS FOR AND PROCESS OF MAKING CYLINDRICAL BODIES
Filed Oct. 4, 1930   16 Sheets-Sheet 15
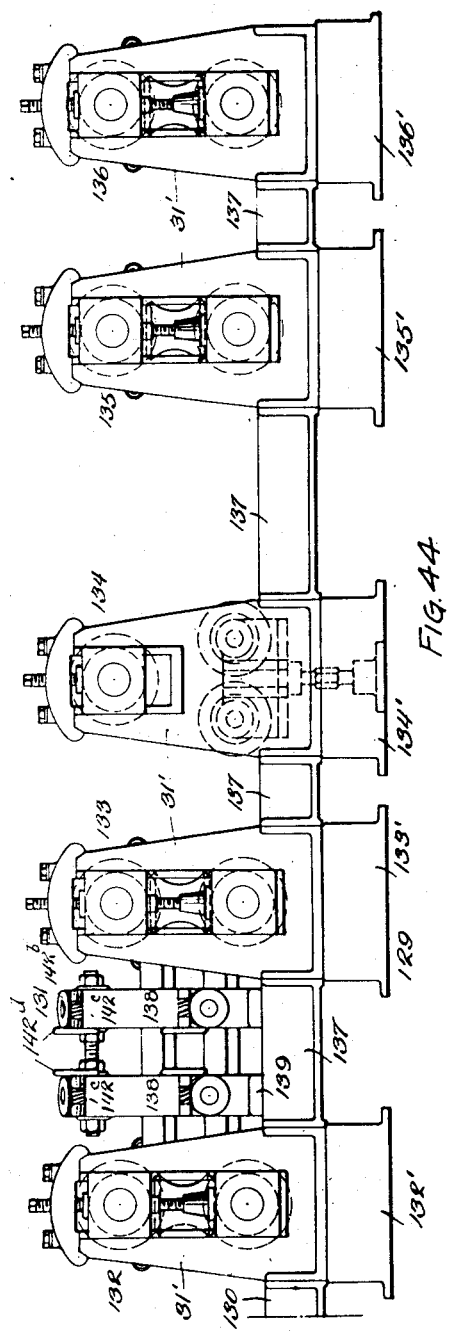
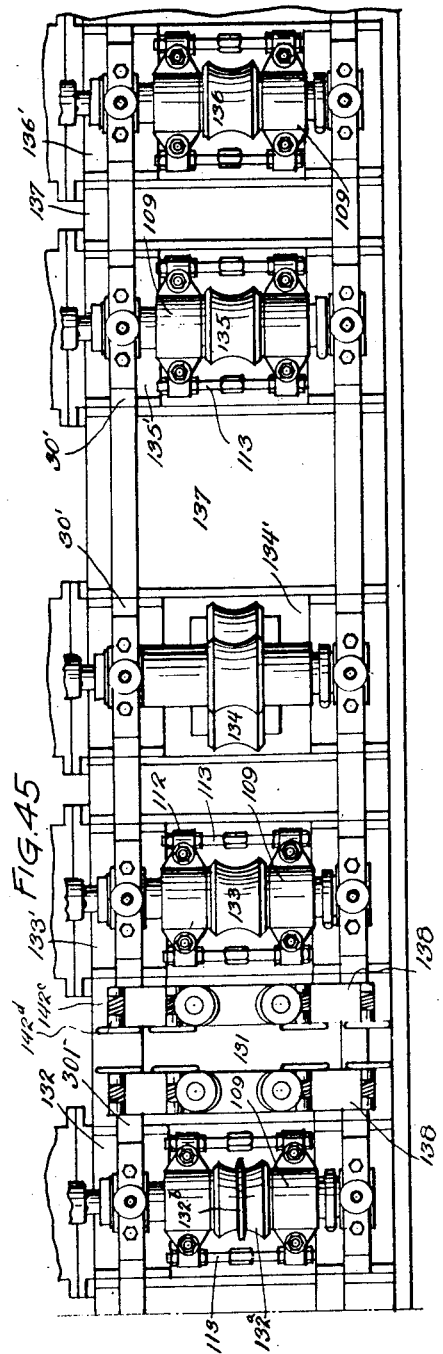
INVENTOR
Carl M. Yoder
BY Geo. A. Pitts
ATTORNEY May 21, 1935.  C. M. YODER  2,001,757
APPARATUS FOR AND PROCESS OF MAKING CYLINDRICAL BODIES
Filed Oct. 4, 1930   16 Sheets-Sheet 16

INVENTOR
Carl M. Yoder
BY
Geo. A. Pitts
ATTORNEY

Patented May 21, 1935

2,001,757

UNITED STATES PATENT OFFICE 2,001,757

APPARATUS FOR AND PROCESS OF MAKING CYLINDRICAL BODIES

Carl M. Yoder, Lakewood, Ohio, assignor of one-half to Harvey O. Yoder, Lakewood, Ohio Application October 4, 1930, Serial No. 486,499

22 Claims. (Cl. 153—54)

This invention relates to an apparatus for and method of (a) forming or shaping plate or sheet steel into cylindrical bodies such as conduits or pipes, for example, pipes for storing and conveying gas, oils and other fluids and (b) welding the seams of the shaped bodies.

The apparatus herein illustrated and the method disclosed may be used for shaping relatively thick plate steel or sheet metal stock of varying thicknesses and of any desired width and length into pipes or cylindrical bodies of any desired diameter. For example, one machine built by me has rolled or shaped plate steel stock having a thickness of three-eighths of an inch into bodies of twenty inch diameter and forty feet long and such machine, by the substitution of other sized rolls is adapted for shaping pipes or cylindrical bodies of larger or smaller diameter, as well as bodies of longer or shorter lengths, and materials of other thicknesses may be used when desired.

One object of the invention is to provide an improved apparatus in which the blanks of plate steel may be rolled into cylindrical bodies, without distortion to or undue strain upon any portion of the metal stock, in a rapid manner with the longitudinal side edges in spaced or abutting relations, as may be desired, and in alignment from end to end.

Another object of the invention is to provide an improved apparatus in which the lateral portions of the blank are progressively curved or bent on substantially the same radii along longitudinal lines starting at its opposite or longitudinal outermost side portions and progressing inwardly until the entire blank is shaped into cylindrical form, whereby rebending or reshaping is eliminated.

Another object of the invention is to provide an improved apparatus having bending elements which progressively bend or curve the lateral portions of the blank on a predetermined radii less than the radius of the blank when finally formed and spaced guiding and holding devices which permit spring back of the bent portions to a curvature having a predetermined larger radii.

Another object of the invention is to construct an improved apparatus in which provision is made for guiding and maintaining the marginal edges of the blank straight as the successive portions of the blank are shaped, whereby final sizing of the body is facilitated, its longitudinal side edges are set in alignment in the same plane from end to end for welding and require no reshaping, straightening or rolling down.

Another object of the invention is to provide means for holding the progressively shaped portions of the blank in fixed relation to their centers as each succeeding shaping operation takes place.

Another object of the invention is to provide an improved mounting for certain of the shaping rolls capable of resisting strains, maintaining a fixed relation between the rolls, and permitting their removal as a unit and relative adjustment.

Another object of the invention is to provide an improved mounting for one or more sets of rolls, whereby the shafts for the side rolls of the set are maintained in line with the axes of the upper and lower rolls thereof.

Another object of the invention is to provide an improved apparatus in which metal blanks may be shaped into cylindrical bodies and the abutting edges thereof welded in a rapid and economical manner.

Another object of the invention is to provide an improved apparatus in which sheet metal blanks are shaped into cylindrical bodies, their abutting edges welded, and the bodies straightened and sized.

Another object of the invention is to provide improved means for conditioning or finishing the longitudinal side edges of the blank.

A further object of the invention is to provide adjacent one or more sets of bending rolls, means for carrying off scale and other material which may result from the bending of the material.

A still further object of the invention is to scrape the outer surfaces of the metal adjacent the abutting edges of the formed bodies to remove therefrom scale, dirt and oil, whereby these surfaces are cleaned ready for welding.

Another object of the invention is to provide an improved process of shaping relatively thick plate steel or sheet stock into cylindrical form with minimum strain on the material, whereby the blanks may be shaped in a rapid manner.

Another object of the invention is to provide an improved process of shaping relatively thick metal stock and sizing the resulting product.

A further object of the invention is to provide an improved process of shaping relatively heavy plate or sheet steel stock into cylindrical bodies and welding the abutting edges thereof.

Other objects of the invention will be apparent to those skilled in the art to which my invention relates from the following description taken in connection with the accompanying drawings, wherein—

Figs. 1 and 1a together illustrate a side elevation of an apparatus embodying my invention and capable of carrying out my process.

Figs. 2 and 2a together illustrate a plan view of the apparatus.

Fig. 3 is a section on the line 3—3 of Fig. 1.

Fig. 3a is a fragmentary section on the line 3a—3a of Fig. 3, enlarged.

Fig. 4 is a section on the line 4—4 of Fig. 1.

Fig. 6 is a section on the line 6—6 of Fig. 1.

Fig. 9 is a section on the line 9—9 of Fig. 1a.

Fig. 9a is a fragmentary section, enlarged, on the line 9a—9a of Fig. 1a.

Fig. 11 is a section on the line 11—11 of Fig. 1a.

Fig. 11a is a section on the line 11a—11a of Fig. 2a.

Fig. 12 is a section on the line 12—12 of Fig. 11.

Fig. 13 is a section on the line 13—13 of Figs. 3 and 14.

Fig. 14 is a section on the line 14—14 of Fig. 13.

Fig. 16 is a perspective view of the final shaping and sizing roll set showing the removal of the set as a unit.

Fig. 16a is a fragmentary section on the line 16a—16a of Fig. 11a, the shaped blank being shown in dotted lines.

Fig. 17 is a fragmentary plan view of the coupling means between each driven shaft and the adjacent roll shaft, with the coupling collar in inoperative position.

Fig. 18 is a fragmentary view, partly in section on the line 18—18 of Fig. 17, with the coupling collar in position.

Fig. 19 is a section on the line 19—19 of Fig. 18.

Fig. 20 is a plan view of a filler.

Fig. 21 is a section through the filler.

Figs. 22 to 38, inclusive, show diagrammatically the steps of my process in shaping the sheet from a blank A into final form.

Fig. 38a is a view similar to Fig. 30, enlarged.

Fig. 39 is a fragmentary perspective view showing the marginal portion of the sheet A as it comes from the shearing devices and is delivered to the feeding rolls.

Fig. 40 is a fragmentary perspective view showing the marginal portion of the sheet after it has passed between the edge shaping or conditioning means.

Figure 41:
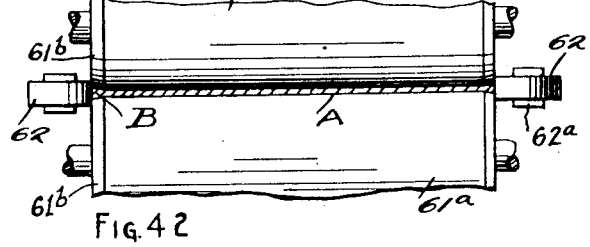

Fig. 41 is a fragmentary plan showing the edge shaping or conditioning means of a different construction and arranged to upset or thicken the marginal side edges, the upper roll being omitted.

Figure 42:
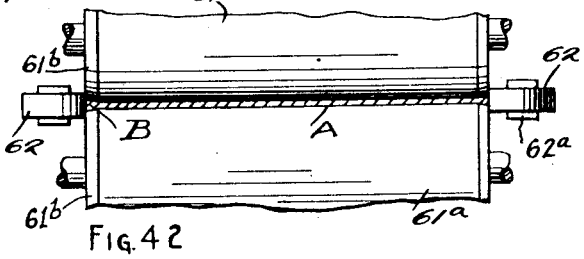

Fig. 42 is a section on the line 42—42 of Fig. 41.

Figure 43:
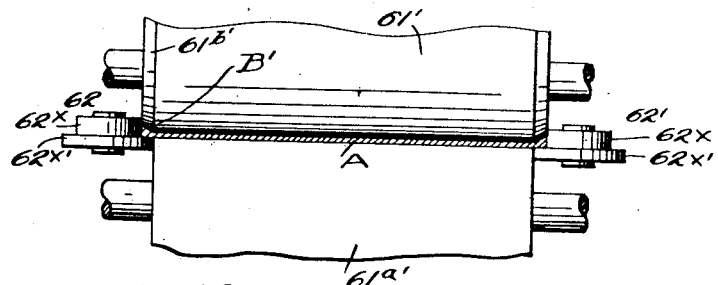

Fig. 43 is a section similar to Fig. 42, but showing a different form of edge shaping and conditioning means.

Fig. 44 is a side elevation of a portion of a machine embodying my invention when it is desired to weld the abutting edges of the formed bodies, and size and straighten same.

Fig. 45 is a plan view of the parts shown in Fig. 44.

Fig. 46 is a section on the line 46—46 of Fig. 44.

Fig. 47 is a section on the line 47—47 of Fig. 44.

Figure 48:
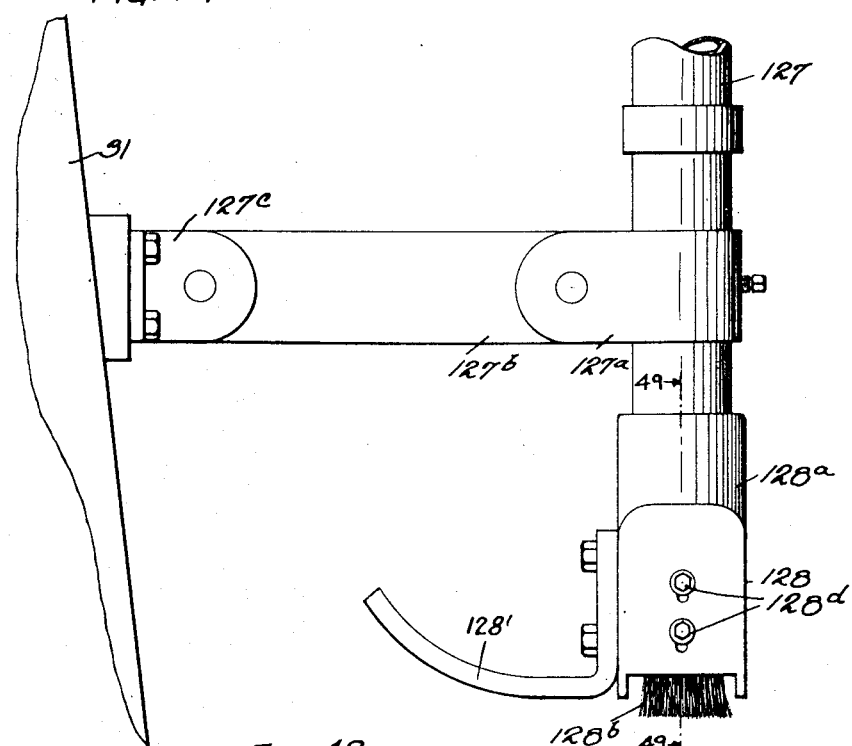

Fig. 48 is a side elevation of one of the vacuum cleaning devices.

Figure 49:
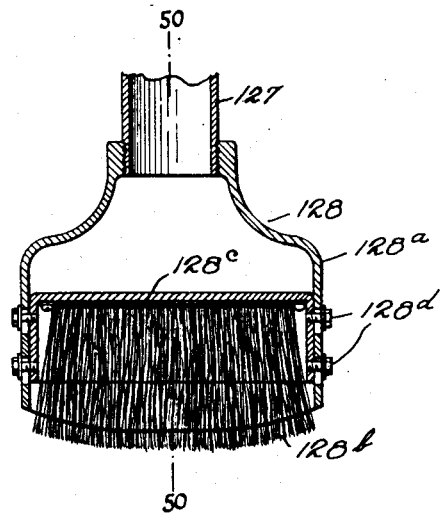

Fig. 49 is a section on the line 49—49 of Fig. 48.

Figure 50:
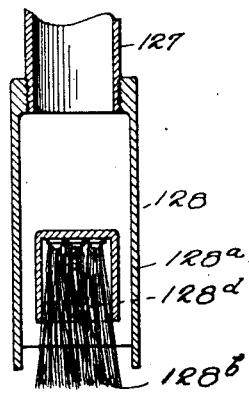

Fig. 50 is a section on the line 50—50 of Fig. 49.

In the apparatus herein illustrated and adapted for carrying out my process, I provide (a) a plurality of sets of bending or shaping rolls constituting passes for the blank and arranged to effect progressive bending or curving and sizing thereof, the upper and lower rolls of each set being preferably driven, (b) means for conditioning the longitudinal side edges or marginal portions of the blank and (c) guiding or holding devices which co-operate with the bending rolls to maintain portions of the blank, after they are bent or curved, in position while or during movement of the blank to and through the successive sets of rolls; and certain other parts and mechanisms hereinafter referred to. I also provide means for welding the abutting edges on the blank and mechanisms for straightening and sizing the completed bodies.

In the drawings, referring to Figs. 1 to 40, inclusive, 1 indicates as an entirety supporting means for a plurality of sets of curving or bending rolls and certain other parts and mechanisms hereinafter referred to. Due to the size and weight of these rolls, parts and mechanisms and the power required to drive the rolls, the supporting means 1 comprise bases 2, 3, 4, 5, 6, 7, 8, 9, 10, 11, 12 on which the respective sets of rolls are mounted, and supplemental bases 2a, 3a, 4a, 5a, 6a, 7a, 8a, 9a, 10a, 11a and 12a, respectively, each supplemental base being secured to one of the main bases and supporting the shafts for a pair of driven gears 14, 14a, which shafts are connected to the shafts of the adjacent lower and upper bending rolls, respectively, of each set and also supporting suitable reduction gearing 13 for driving the gears 14, 14a, for the adjacent set of rolls. Also, rigidly secured to the supplemental bases are auxiliary bases designated 2b, 3b, etc., each of the latter bases supporting a motor 15 (preferably an electric motor), the shaft of which is connected through a suitable coupling 16 to the main shaft 17 of the adjacent reduction gearing 13. Each reduction gearing 13 may consist of a gear 18 fixed to the adjacent shaft 17 and meshing with a pinion 19. The pinion 19 is fixed to a shaft 20 carrying a gear 21, which meshes with a pinion 22 fixed to a shaft 23. The reduction gearing 13 is mounted within a sectional housing 13a, the walls of which support suitable bearings for the shafts 17, 20 and 23, as shown in Fig. 14. The shaft 23 is connected through a coupling 23a with a shaft 24, which has bearing in spaced standards 25, 25a, mounted on and secured to the adjacent supplemental base, and carries between the standards the adjacent gear 14, the gear being suitably keyed to the shaft; and the shaft 24 in turn is connected through a coupling means 26 (the elements of which are detachable as hereinafter set forth) to the adjacent lower roll shaft 27. 28 is a shaft mounted in suitable bearings 28a supported by the standards 25, 25a, and carrying the adjacent gear 14a, the gear being suitably keyed to the shaft. The shaft 28 is connected through a coupling means 26a (which is preferably similar to the coupling means 26) with the adjacent upper roll shaft 29. The ratio of the gears 14, 14a, for driving the shafts 27, 29, for each set of rolls is such that said bending rolls have the same peripheral speed. It will be understood that the shafts for the upper and lower rolls of each roll set are driven in the manner and by mechanism similar to that above described, corresponding parts being indicated by the same reference characters, so that it will not be necessary to duplicate or repeat this description for each set of rolls. It will also be understood that the bases 2, 3, etc. may be spaced from each other any desired distance depending upon the space required to accommodate certain of the guiding and holding devices (to which reference will later be made) and other parts between or associated with the sets of rolls, or for other reasons. The bending rolls are detachable from the shafts 27, 29, to permit substitution of rolls of a different size.

The sets of rolls between which the metal blank A is passed, except the last two sets (to which reference will later be made), comprise lower and upper rolls 2'—2'', 3'—3'', 4'—4'', 5'—5'', 6'—6'', 7'—7'', 8'—8'' and 9'—9'', 10'—10'', respectively; however, I may provide a larger or lesser number of sets of rolls depending upon the thickness of the blanks and more especially on the diameter of the body being formed, in order to effect progressive bending thereof in a rapid manner without distortion of or undue stresses on the metal.

Figure 10A:
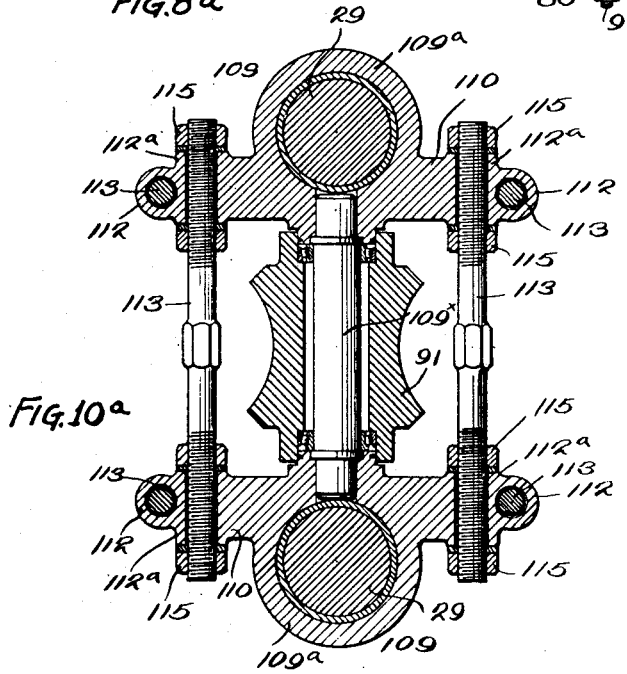
Fig. 10a is a section on the line 10a—10a of Fig. 10.
Figure 10:
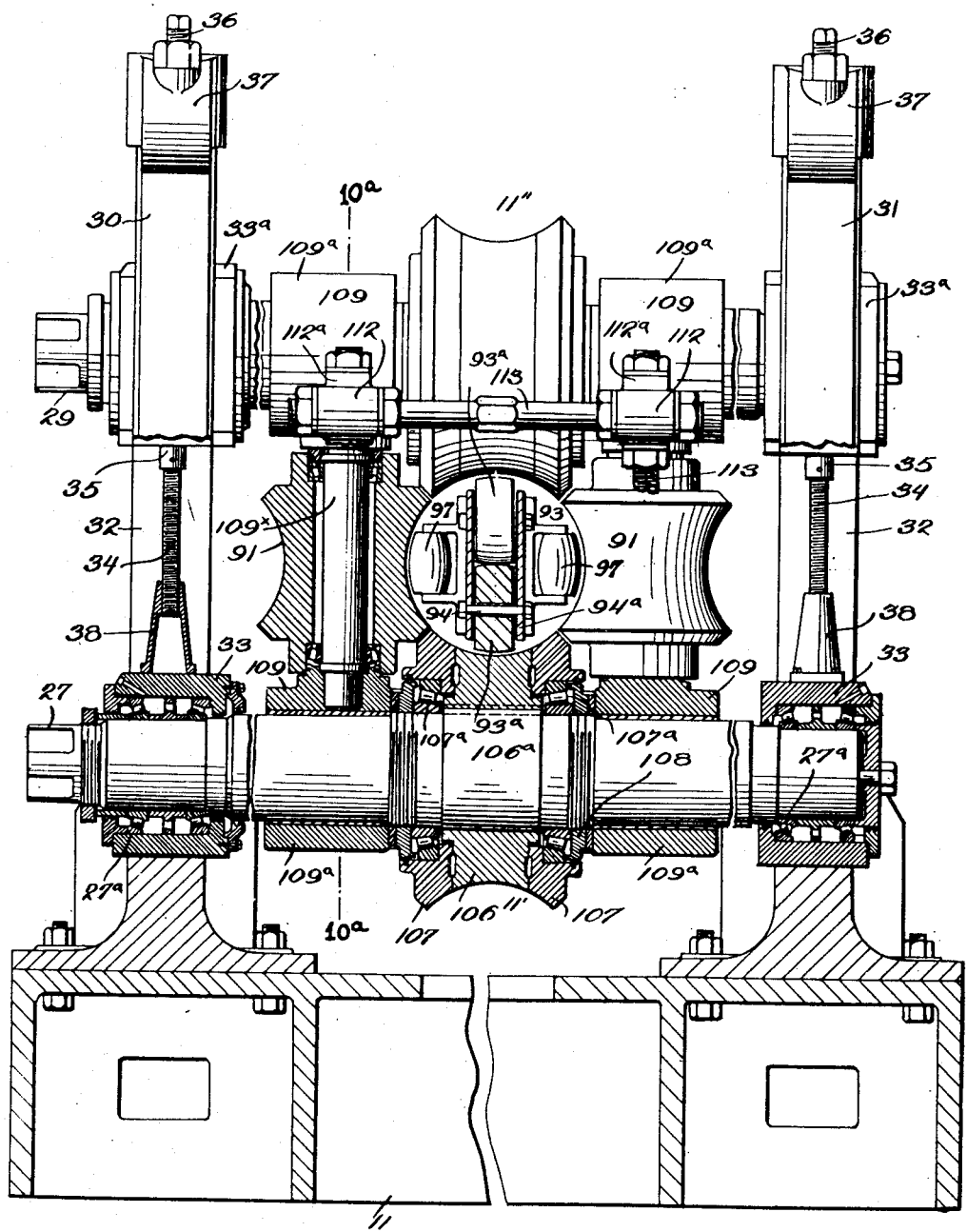
Fig. 10 is a section on the line 10—10 of Fig. 1a, enlarged.

The shafts for each set of rolls above identified are mounted in a similar manner, so that the following description of one mounting, for example the mounting for the set of rolls 2'—2'', will suffice for the remaining mountings. The base 2 mounts adjacent its opposite ends upright standards 30, 31, each having spaced portions open at their upper ends and forming guides 32, to slidably and adjustably receive the grooved side walls of pairs of journal boxes 33, 33a, for the opposite ends of the shafts 27, 29, respectively. The boxes 33 for the shaft 27 preferably rest on the bottom walls of the standards between the spaced portions thereof, whereas the boxes 33a for the shaft 29 are slidably mounted between these spaced portions and are adjustably clamped or secured in fixed relation to the boxes 33. For this latter purpose, I preferably provide between each box 33 and the adjacent box 33a one or more screws 34 which bear at their lower ends in or on the box 33 and at their upper ends project into recesses formed in the box 33a, each screw having a nut 35 (of ring shape) threaded thereon and engaging the lower side of the journal box 33a, so that by rotating the nuts, the upper shaft 29 may be adjusted, the effect of which is to space the adjacent upper roll relative to the co-acting lower roll dependent upon the thickness of the blank. Each upper box 33a is rigidly secured against the nuts 35 on the adjacent adjusting screws by a bolt 36 threaded in and through an opening formed in a bridge or cap plate 37 suitably bolted to the upper ends of the spaced portions of the adjacent standard 30 or 31. Where by reason of the diameter of the upper rolls (see rolls 6'—6'', 7'—7'', 8'—8'', 9'—9'', 10'—10'', 11'—11'' and 12'—12'') the journal boxes for the roll shafts are spaced a considerable distance, I prefer to suitably secure to each box 33 a tapered shaped pedestal 38 (Fig. 10) having a threaded opening at its upper end into which is threaded the adjusting screw 34, this arrangement eliminating the necessity of using a relatively long screw. The journal boxes for the opposite end of each roll shaft 27, 29, are preferably provided with sets of anti-friction roller bearings 27a as shown in Fig. 10.

The arrangement and construction herein illustrated is adapted to shape blanks A having approximately a ⅜th inch thickness and the metal of which has approximately a .31 carbon content, into cylindrical bodies having a diameter of twenty inches. Where these conditions and dimensions prevail, each set of lower and upper rolls 3'—3'', 4'—4'', 5'—5'', 6'—6'', 7'—7'', 8'—8'', 9'—9'' and 10'—10'' is arranged to simultaneously curve or bend lateral portions or increments of the blank on longitudinal lines on radii of approximately nine and one half inches; and following each bending operation, the bent portions are allowed to "spring back" due to and to compensate for the inherent resiliency of the metal. To permit of the necessary "spring back" and also to insure that a predetermined diameter of the formed cylinders result, I provide a plurality of pairs of guiding and holding devices (to which reference will later be made), which hold those portions of the blank that have been curved while the blank is passing succeeding sets of rolls, these devices being arranged to permit "spring back" of the metal to a radius of approximately 10 inches. It will therefore be seen that the inherent resiliency of the metal, due to its thickness and constituent chemical elements, such as its carbon content or alloyed composition, is compensated for, for a predetermined diameter of product by bending the metal at each pass to substantially a predetermined radius, less than the desired or the intended radius of the formed body, so that in the spring back of the metal, the shaped portions will assume the desired radius and result in a formed body of the predetermined diameter.

The arrangement for allowing "spring back" of the metal to a larger radius is advantageous to compensate for the inherent resiliency of the metal and also because it provides between the longitudinal side edges of the blank, before the latter is finally shaped, sufficient clearance for the last internal shaping roll (10''—see Fig. 34) and the support for a mandrel (93) which co-operates with the last set of shaping rolls 11'—11''—91 to curve or bend the central or midportion e of the blank (see Fig. 36) and with the sizing set of rolls 12'—12''—114.

The first set of rolls 2'—2'' constitute blank feeding rolls, and the remaining sets of rolls constitute bending or curving rolls.

In the pass between the rolls 3'—3'', the lateral portions c of the blank A are simultaneously bent or curved on a radius of approximately 9½ inches, as shown in Fig. 24; in the pass between the rolls 4'—4'' the next inward lateral portions d of the blank are similarly simultaneously bent or curved, as shown in Fig. 25; and in each succeeding pass between the rolls 5'—5'', 6'—6'', 7'—7'', 8'—8'', 9'—9'' and 10'—10'' adjacent inward lateral portions of the blank are similarly simultaneously bent or curved, about the same radii. As each blank feeds through the apparatus, its opposite longitudinal marginal portions extend first beyond the opposite ends of the upper shaping rolls (see Fig. 25) and then beyond the opposite ends of the lower rolls (see Fig. 28). As shown in the drawings, pairs of guiding and holding devices are provided on the lower bending rolls, other pairs of devices are associated with certain of the sets of rolls and other pairs of devices are disposed between adjoining sets of rolls. These pairs of devices serve to guide the progressively shaped lateral portions of the blanks as they extend beyond the upper rolls and then beyond the lower rolls (as above described) and to hold them in a predetermined position about their imaginary centers, that is, on the larger radii, due to "spring back" of the metal, as will be clear from the enlarged diagrammatic view (Fig. 38a), so that distortion of the metal and undue stresses thereon are eliminated and reshaping of the blanks is avoided.

Figure 38:
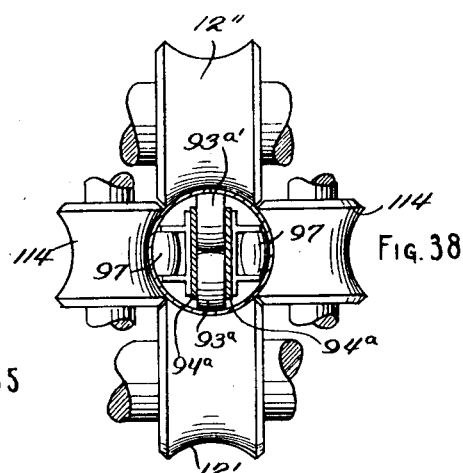
Figure 35:
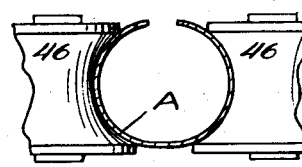
Figure 36:
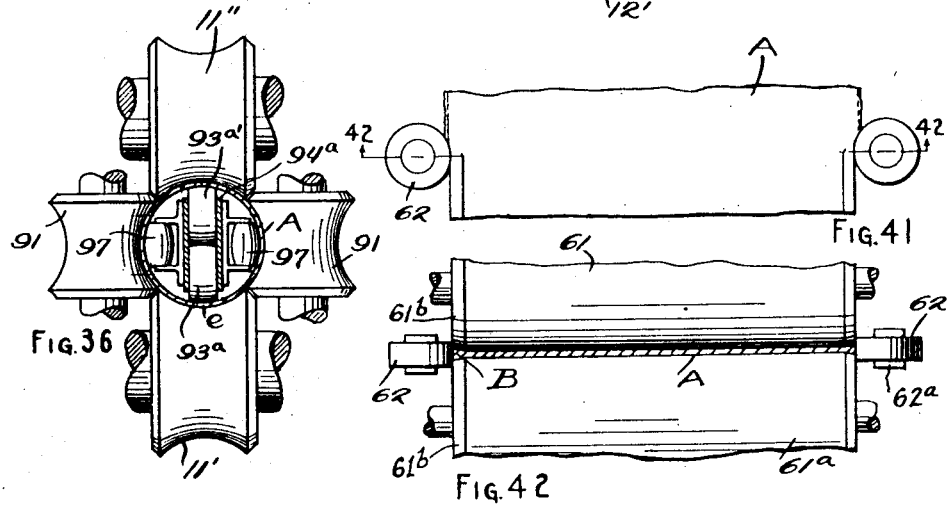

From the foregoing description in connection with the diagrammatic views (Figs. 22 to 35, inclusive), it will be seen that first the outermost lateral portions of the blank are shaped, then the succeeding inwardly lateral portions are simultaneously shaped progressively, until the central or mid-portion of the blank is reached; I then curve the central or mid-portion of the blank substantially on the radius of approximately 10 inches, as shown in Fig. 36, and finally the formed or shaped blank is sized, as shown in Fig. 38, by the set of rolls 12', 12'', as will later be set forth.

Figure 9A:
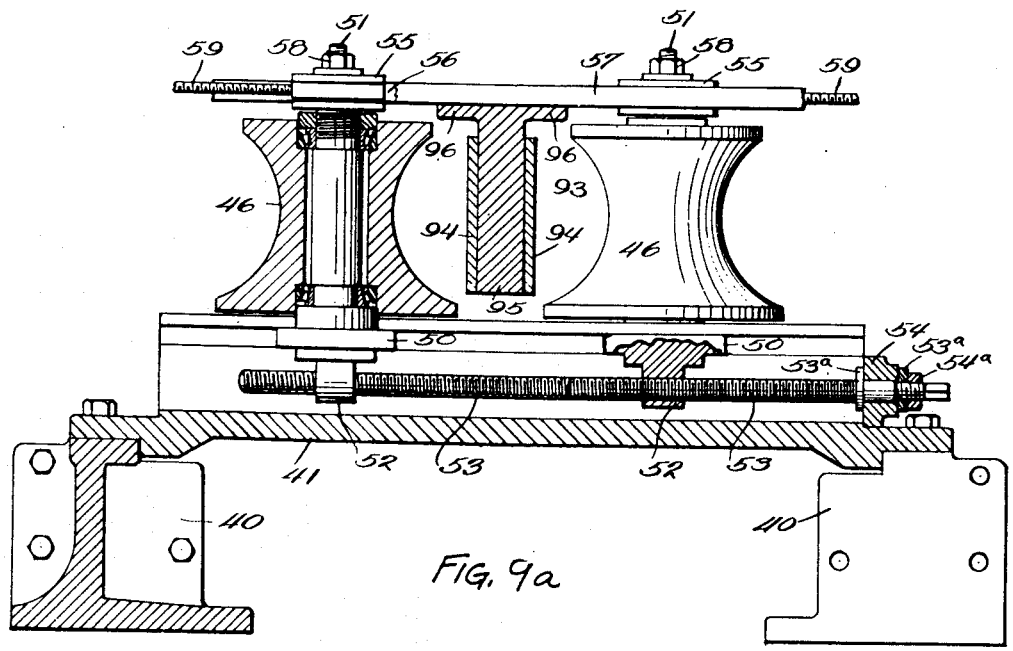
Figure 8:
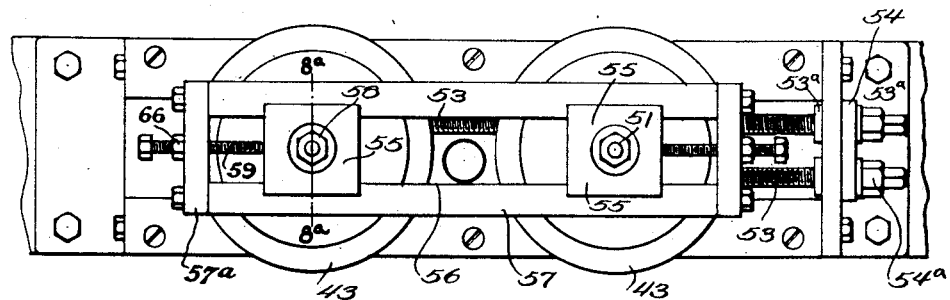
Fig. 8 is a section, enlarged, on the line 8—8 of Fig. 1.
Figure 8A:
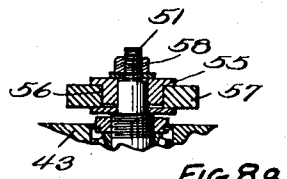
Fig. 8a is a fragmentary section on the line 8a—8a of Figs. 7 and 8.

39 indicates as an entirety means for conditioning the longitudinal side edges or marginal portions of the blanks, whereby these side edges, when aligned or related edge to edge upon the final bending or curving of the blank into cylindrical form, may be readily and effectively welded, to provide a joint that is liquid and gas tight, as well as capable of withstanding internal and external pressure. The conditioning means are preferably arranged between the feeding rolls 2'—2'' and the first bending pass or set of rolls 3'—3''. When the blank A comes from the cutting mechanism, such as gang shears, its lateral or longitudinal side edges are not only rough and ragged, but each may be formed with an off-set such as shown at a in Fig. 39. In Figs. 1, 2, 3, 3a and 23 I have shown one form of means for conditioning these side edges by upsetting and rolling down the marginal portions and side edges to produce flat straight side edges a', disposed at substantially right angles to the opposite faces of the blank, as shown in Fig. 40. Of the means 39, 40 indicates a pair of blocks or castings (see Figs. 1 and 3) engaging the opposed side edges of the bases 2, 3, and rigidly secured to the standards 30, 31, carried thereby, respectively. 41 indicates a support secured at its opposite ends to the blocks 40 and adjustably carrying the conditioning rolls 42, 42. The support and mounting for the conditioning rolls 42 being similar to the support and mounting for certain of the pairs of guiding and holding devices, 43, 44, 45, 46 and 47, views of the latter may be referred to, to understand the construction of the mounting for the rolls 42. Referring to Fig. 3a, it will be noted that the inner walls of the vertical sides of the support 41 are cut away, as shown at 41a and these sides are provided with plates 49 which overhang the cut-aways to form guides extending transverse to the direction of movement of the blank A and slidably supporting a pair of shoes 50 (see also Fig. 9a), each provided with an upstanding spindle or shaft 51 (preferably formed integrally with the adjacent shoe) on which one roll 42 (roll 46 in Fig. 9a) is mounted. The shoes 50 are provided with depending lugs 52 (each off-set relative to the other), formed with threaded openings in which are mounted feed screws 53, 53, respectively. The outer portion of each screw 53 extends through and rotatably fits an opening formed in one end wall 54 of the support 41 and at opposite sides of the wall 54 the screw is provided with suitable collars 53a (see Fig. 9a), which engage the wall so that when the screw is rotated it will be held against endwise movement. The wall 54 preferably comprises a casting suitably bolted to the adjacent end of the support 41. As shown in Fig. 9a, the inner collar 53a is fixed to the shank of the screw, whereas the outer collar 53a is held in place by a nut 54a threaded on the shank, the tightening of the nut serving to clamp the collars 53a to the wall 54 to lock the screw against rotation. The shank of each screw 53 is extended beyond the nut 54a and shaped to take a suitable tool, whereby the screw may be rotated. As will be understood, the collars 53a, 53a, take the thrust imparted to the screws due to the lateral pressure on the adjacent pair of rolls. By rotating the screws 53, the shoes 50 may be adjusted independently, each toward or from the other shoe, to locate the roll 42 in proper relation to the edge of the blank A. Suitable anti-friction bearings may be provided between the upper and lower ends of each roll 42 and the adjacent shaft 51, similar to those shown in Figs. 8a and 9a. The upper ends of the shafts 51 may be tied together to hold the shafts vertically and to resist the lateral strains incident to the rolling down and conditioning of the blank edges. For this purpose, the upper ends of the shafts 51 are provided with slides 55 the sides of which are flanged to slidably fit the side walls of a guide-way 56 extending longitudinally of a tie member 57. Each slide 55 consists of two spaced parts (see Figs. 3a, 8a and 9a) fitting over the adjacent shaft 51, the lower part resting on a shoulder formed by reducing the upper portion of the shaft, and these parts being clamped against the upper and lower faces of the tie member 57 by a nut 58 threaded on the free end of the shaft. I also prefer to provide adjustable abutments, which engage the outer sides of the slides 55 to reinforce the clamping means therefor. Each abutment comprises a rod 59 having a threaded portion fitting a threaded opening formed in the adjacent end wall 57a of the guide-way 57 and held in adjusted position by a lock nut 60 (see Fig. 8). Each abutment is adjusted so that its inner free end is in engagement with the adjacent slide 55 to prevent lateral flexing or bending moment on the adjacent shaft 51.

Each roll 42 is formed centrally with a peripheral groove 42a to receive the marginal portion of the blank A as it moves from the feeding rolls 2'—2'' to the bending rolls 3'—3''. The bottom of the groove 42a is preferably parallel to the roll axis and the upper and lower faces of the groove are at right angles to its bottom, and cooperate therewith to roll down the marginal portions and side edges of the blank to finish these side edges, as shown at a' in Fig. 40. When desired the bottom of the groove may be disposed at an angle to the roll axis, in which event the side edges of the blank A will be at a similar angle to the opposite faces thereof.

In Figs. 41 and 42 I have shown another form of construction for conditioning or rolling down the marginal portions and side edges of the blank A, where it is desired to upset or thicken the lateral marginal edges to provide additional metal adjacent or along the joint to be welded. In this form of construction I provide upper and lower rolls 61, 61a, having beveled peripheries 61b at their opposite ends and a pair of side rolls 62, mounted on vertical shafts 62a and cooperating with the rolls 61, 61a, to upset the marginal portion of the blank to thicken such portions, as shown at B, and to roll down their lateral side edges. By changing the shape of the rolls, I may give the marginal portions and side edges any desired shape. Where the rolls 61, 61a, 62, are employed, I may mount them on a separate base and drive the rolls 61, 61a or either thereof, by mechanism similar to that used for driving each set of rolls, as already described.

In Fig. 43 I have shown another form of construction for conditioning the side edges of the blanks A, wherein the metal is thickened or upset on one face only of the blanks. In this view 61', 61a' indicate the upper and lower rolls, respectively, the upper roll being extended relative to the lower roll and having beveled peripheries 61b' at its opposite ends. 62' indicates the side rolls each having a flat peripheral portion 62x and a flange portion 62x', which portions co-operate with the roll 61a' and beveled peripheries 61b' to upset the metal and condition the side edges of the blank, as shown at B'.

The pairs of guiding and holding devices which first operate to hold the bent lateral portions, as already set forth, are provided on the lower bending rolls 4', 5', 6', 7', 8', 9' and 10' by extending these rolls beyond the opposite ends of the respective upper rolls, as shown at 48, and curving the peripheries of such portion on a radii (to wit ten inches) larger than those portions of the rolls which co-operate with the upper rolls to bend the lateral portions of the blank as already described.

The guiding and holding rolls 43, 44, 45, 46 and 47 are disposed between certain of the sets of rolls, as shown, and are mounted and adjustable similarly to the rolls 42, as already set forth, and the upper ends of the shafts for these rolls are supported and tied or connected similarly to the rolls 42. As will be noted, the peripheries of the rolls of each pair of rolls 43, 44, 45, 46 and 47 are shaped to compensate for the "spring back" of the metal and serve to guide and hold the shaped lateral portions of the blank after passing the previous sets of rolls, in fixed relation to their axes, and thus prevent lateral distortion of the blank in passing from one set of rolls to the next set. These rolls co-operate with the remaining pairs of guiding and holding devices already referred to.

Figure 5:
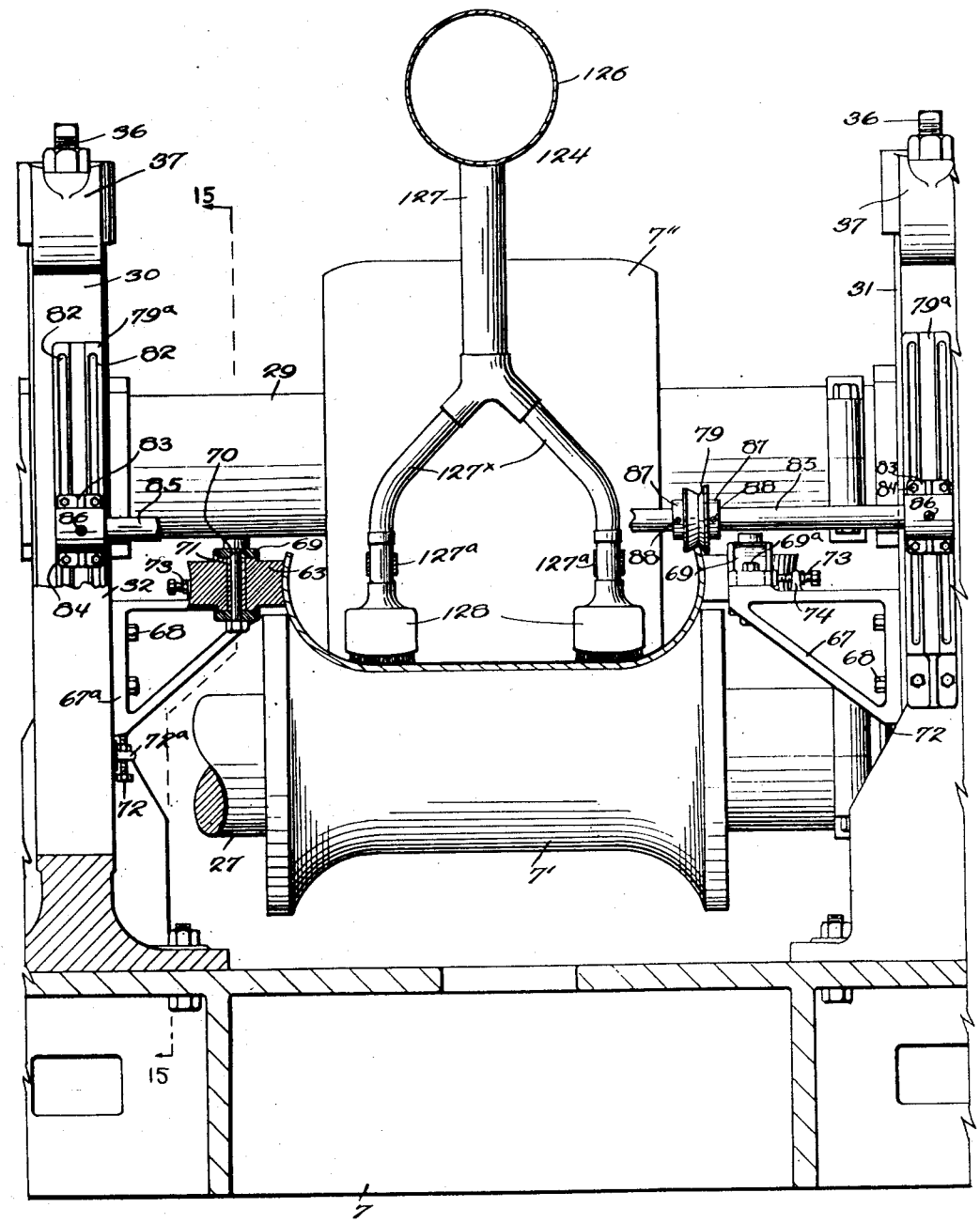
Fig. 5 is a section partly on the line 5—5 and partly on the line 5a—5a of Fig. 1, enlarged.
Figure 15:
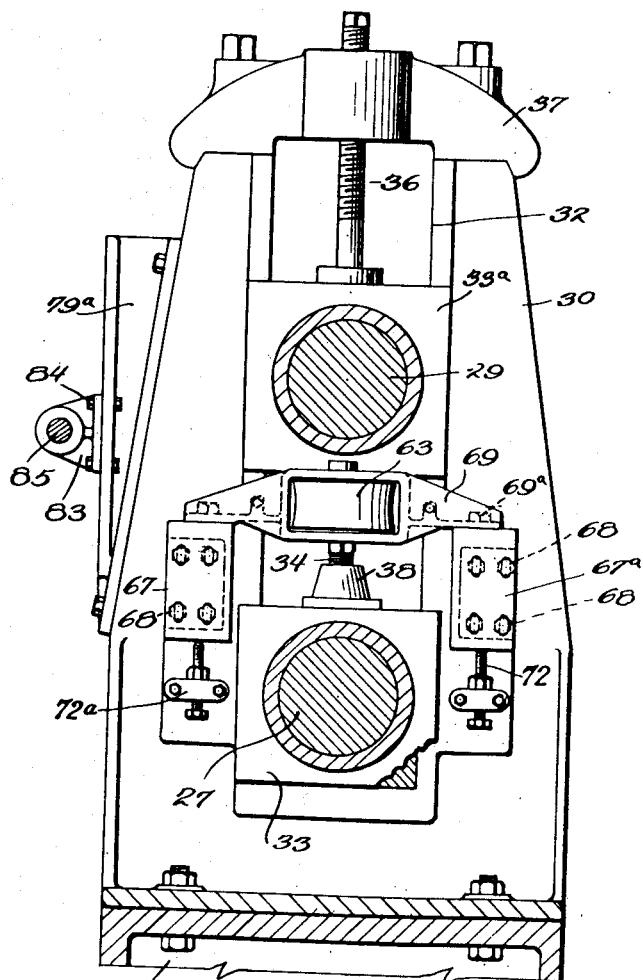
Fig. 15 is a section on the line 15—15 of Fig. 5.
Figure 33:
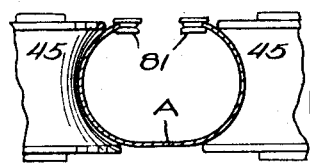
Figure 37:
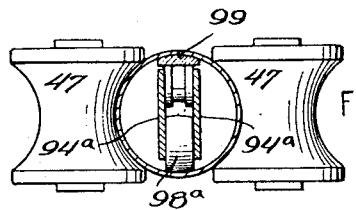
Figure 34:
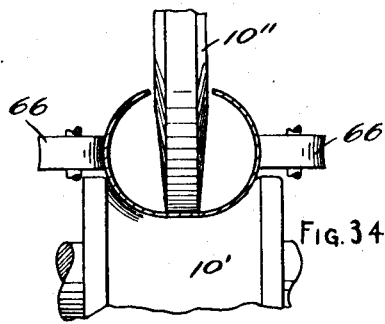

63, 64, 65 and 66 indicate those pairs of devices which are associated with certain of the sets of rolls, and serve to guide and hold the previously bent or shaped portions of the metal in fixed relation to their axes, while the adjacent set of rolls is imparting additional bends in the blank. The pairs of devices 63, 64, 65 and 66 are of similar construction and are similarly mounted so that a description of one pair will suffice for each of the remaining pairs. Referring to Figs. 5 and 15, which show in detail the mounting for these holding devices, 67, 67a, indicate pairs of spaced brackets adjustably secured to the inner sides of the adjacent standards 30, 31, by bolts or cap screws 68 at opposite sides of and preferably equal distances from a plane cutting the axes of the adjacent bending roll shafts. 69 indicates a casting supported on and adjustably secured by bolts or cap screws 69a at its opposite ends to the adjacent pair of brackets 67, 67a. Intermediate its ends, each casting 69 is shaped to form a transverse opening through it, the upper and lower walls of which are formed with aligned openings, in the plane of the shafts 27, 29, to receive a bolt 70. The bolt is provided with a bushing 71 which forms a shaft for a guiding device 63, consisting of a roller, the periphery thereof being concaved to conform to substantially the curvature of the shaped portion of the blank. To provide for the vertical aljustment of the brackets 67, 67a, the openings for their clamping bolts are elongated vertically, as shown in dotted lines in Fig. 15; by loosening these clamping bolts, the brackets may be raised or lowered. The adjustment of the brackets may be effective by adjusting screws 72, suitably threaded in lugs 72a, bolted to side walls of the standards 30, 31. The adjustment of the roller 63 toward or from the blank is provided for by making the openings for the bolts 69a elongated in a direction transverse to the movement of the blank, so that by loosening these bolts the castings 69 may be moved each toward or from the other. The adjustment of each casting is preferably effected by a pair of adjusting screws 73, each threaded in a lug 74 formed integrally with the adjacent bracket. From the foregoing description, it will be seen that each pair of guiding devices 63, 64, 65 and 66 is disposed in line with the axes of the adjacent roll shafts 27, 29, altho this is not an essential arrangement in my construction.

As will be understood the sets of guiding and holding devices 43, 44, 45, 46, 47, 63, 64, 65, and 66 are correlated with the sets of rolls adjacent or between which they operate and serve to maintain the shaped portions of the blank, as they are progressively shaped, in bent up relation to the unbent portions thereof, and to resist any tendency of these portions to flex laterally due to strains imparted to the metal by the bending action of the bending rolls.

Figure 2:
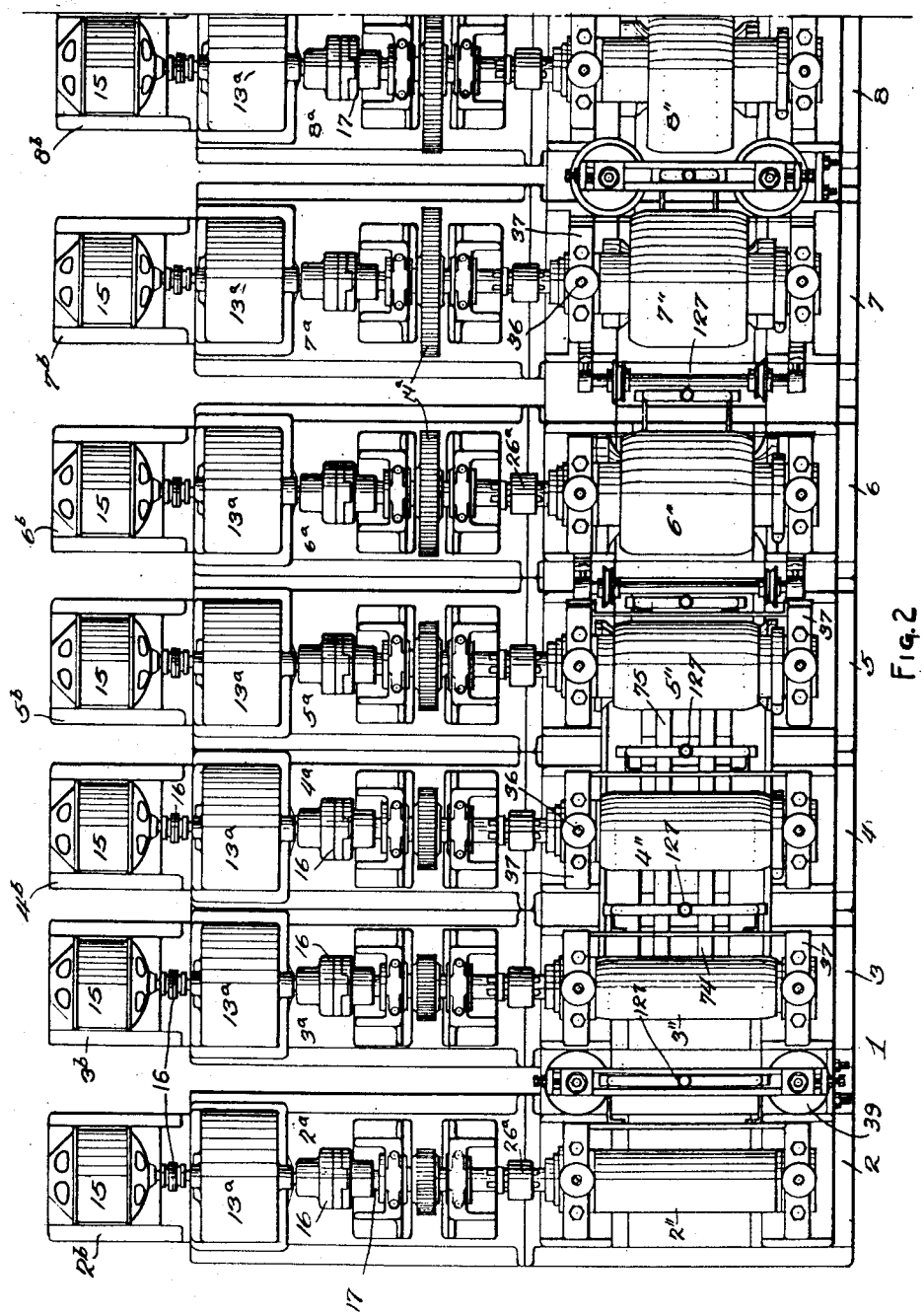

74 indicates a set of guide elements disposed between the sets of rolls 3'—3'' and 4'—4'' (see Figs. 1, 2 and 4. 75 indicates a set of guide elements between the sets of rolls 4'—4'' and 5'—5''. Each of these sets of guide elements comprise a pair of side bars 74a and intermediate bars 74b. The upper surfaces of these bars conform approximately to the shape of the adjacent rear set of rolls through which the blank has passed and serve to support the blank as well as to maintain its bent or shaped portions in fixed relation to the imaginary centers of such portions (see Fig. 4). The elements 74a, 74b, of each set are suitably secured to a transverse support 76 mounted on blocks 77, which are secured to the bases 3, 4 and 4, 5, similarly to the blocks 40.

78, 79, 80, 81 indicate pairs of rollers arranged to be engaged by the longitudinal side edges of the blank A as it moves from certain of the sets of bending rolls to the next sets of rolls, respectively. The rollers of each pair are grooved to receive the blank edges and co-operate with the adjacent blank side guiding and holding rolls to resist stresses which tend to flex or distort the marginal or edge portions of the blank into an irregular or crimped shape; also to guide the side edges in a rectilinear direction and thus prevent the blank from twisting or rotating about its axis; these rollers also serve to maintain the blank against the sides of the guiding and holding rolls, so that each pair of the latter rolls may maintain the bent up or shaped portions of the blank in aligned relation to the succeeding set of rolls.

The pairs of rollers 78, 79, are mounted in a similar manner, so that the description of the mounting for the pair of rolls 79 will suffice for both pairs. Referring to Fig. 5, 79a indicates a pair of brackets fixed to the rear sides of the standards 30, 31, which support the bending rolls 7'—7". The outer vertical edge of each bracket is provided with flanges extending from end to end thereof, these flanges being formed with slots 82. 83 indicates a pair of blocks or supports secured to the flanges by suitable bolts 84 which extend through openings formed in the blocks and through the slots 82 and engage nuts on the inner side of the flanges. The blocks 83 are formed with horizontal openings into which fit the opposite ends of a shaft 85, these ends being secured in the openings by set screws 86. The rollers 79 are grooved to receive the edges of the blank and loosely rotate on the shaft 85, each being held against lateral movement thereon by a pair of collars 87, adjustably fixed to the shaft by set screws 88. As the collars 87 are adjustable endwise of the shaft, the guide rollers 79 may be properly positioned for engagement by the side edges of the blank.

Figure 7:
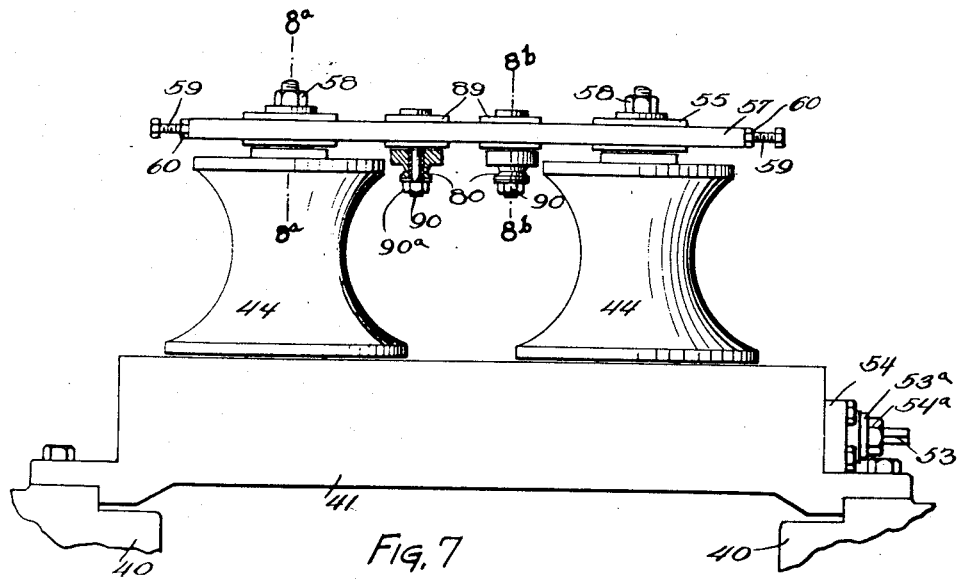
Fig. 7 is a fragmentary view on the line 7—7 of Fig. 1, parts being in section.
Figure 8B:
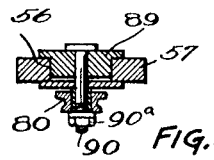
Fig. 8b is a section on the line 8b—8b of Fig. 7.

The pairs of rollers 80, 81, are mounted somewhat differently from the rollers 78, 79, since they rotate on vertical shafts. By preference, each pair of rollers 80, 81, is mounted on a tie member 57 for a pair of guiding and holding rolls, one pair being mounted on the tie member 57 for the rolls 44 and the other pair being mounted on the tie member 57 for the rolls 45. Referring to Figs. 7 and 8b, which show the mounting for the rolls 44, 89 indicates a pair of adjustable blocks, constructed similarly to the slides 55, 55', and slidably fitting the guide-way 56 in the tie member 57. 90 indicates a bolt passing through the openings in the parts of each block and carrying on its lower portion a bushing on which the adjacent roll 80 loosely rotates. As shown, the lower part of the block engages the bushing, so that by tightening the nut 90a, the parts of the block will be clamped to the opposite faces of the tie member 57. By loosening the nuts 90a, each block 89 may be adjusted along the guide-way 56 to locate the adjacent roller in the desired position.

The final bending rolls 11'—11" have associated with them a pair of side rolls 91, 91, supported by the shafts 27, 29, for the rolls 11'—11", respectively, in such manner (as will later be described) that all of the rolls may be removed as a unit from the adjacent standards 30, 31, without disassembly, whereby a set of rolls for shaping a different diameter of pipe may be substituted. The final shaping rolls 11', 11", 91 and 91 co-operate with a mandrel indicated as an entirety at 93 to bend or curve the intermediate or central portion of the blank on substantially the same radius as the remaining previously curved portions, as shown in Figs. 10 and 36. The mandrel 93 comprises pairs of superposed convex rollers 93a, 93a', (see Figs. 10 and 11a) one pair being disposed in line with the axes of the final bending rolls 11'—11" and the other pair being disposed in line with the axes of the sizing rolls 12', 12", to be later referred to. The rolls 93a, 93a', of each pair have rolling engagement with each other and with the diametrical opposite inner surfaces of the blank (see Fig. 36). The rollers 93a, 93a', loosely rotate on shafts 94, 94, supported at their ends in a pair of side plates 94a, rigidly secured at their outer ends to the lower end of an arm 95, which depends downwardly from the adjacent tie member 57 for the guide rolls 46 (Figs. 9 and 9a) through the space between the opposed side edges of the blank, the upper end of the arm being provided with flanges 96, which are suitably bolted to the tie member 57.

97 indicates pairs of guide rolls mounted on vertical shafts which are suitably supported on the opposite outer sides of the plates 94a, each pair being preferably arranged forward of one of the pairs of rolls 93a, 93a'. The rolls 97 engage the inner walls of the shaped blank and serve to maintain the mandrel centrally thereof. 98 indicates a shaft mounted in the side plates 94a and supporting therebetween a roll 98a adapted to engage the lower portion of the shaped blank and co-operate with a shoe 99 mounted on the upper ends of the plates 94a to support the inner portion of the mandrel axially of the shaped blank. The shoe 99 preferably comprises an elongated plate interposed between the sets of rolls 11'—11", 12'—12", and has convex upper surfaces with which the upper inner portions of the shaped blank engage. The shoe 99 also serves to maintain the marginal edge portions of the shaped blank in aligned relation, so that danger of these portions springing or otherwise being moved into overlapping relation one with the other is eliminated. The shoe 99 is suitably secured to a pair of inverted U-supports 100 (see Fig. 16a). The legs of each U-support are provided with aligned openings to receive a bar 101 the extended portions 101a of which are provided with grooves 102 which slidably fit the side walls of slots 103 formed in the plates 94a. The extended portions 101a of the bar 101 are formed with threaded openings 104 to receive screws 105 the lower ends of which engage the bottom of the grooves 103. By rotating the screws 105, the bar 101 may be moved vertically to adjust the shoe at the proper distance relative to the roll 98a. The screws are locked against turning by nuts 105a.

As shown in Figs. 10 and 36, the lower roll 11' has a curved periphery corresponding to the curvature of the upper roll 11" and the side rolls 91 and the mandrel rolls 93a, 93a' have substantially similar or complementary curvature, such curvature being of substantially the same radius as that provided for by the pairs of guiding and holding devices already referred to; accordingly, as the blank makes the pass between the rolls 11'—11", its intermediate or central portion will be bent or curved and complete the shaping of the blank.

The lower roll 11' and upper roll 11" are preferably of sectional construction, both rolls being constructed as shown in the sectional portion of Fig. 10, each roll comprising an inner section 106 and side sections 107. In this arrangement, the inner roll section 106 is suitably keyed to the central, enlarged portion 106a of the adjacent shaft 27 and the side sections 107 rotate freely on suitable anti-friction thrust bearings 107a provided on the shaft at either side of the portion 106a. As shown, the shaft 27 is reduced at either side of the portion 106a to form seats for the inner races for the bearings 107a, the inner race of each bearing being held in position by a nut or collar 108 threaded on the shaft and locked by a nut 108a.

109 indicate pairs of upper and lower truss members, each pair having collars 109a loosely fitting the adjacent shaft 27 or 29, at opposite sides of the bending roll 11' or 11" thereon. The arms 110 of each member 109 extend forwardly and rearwardly relative to the adjacent shaft and the outer end of each arm 110 is provided with a pair of hollow bosses 112, 112a, the former extending horizontally and aligned with the horizontal boss 112 of the adjacent arm of the other truss member of the pair and the latter extending vertically and aligned with the boss 112a of the adjacent arm of the corresponding truss member on the other roll shaft. 113 indicates rods; one thereof having its opposite ends extending into and through each two aligned horizontal bosses and one having its opposite ends extending through each two aligned vertical bosses, each end portion of each rod being threaded to take nuts 115 which are clamped against the opposite ends of the adjacent boss. By reason of the construction above described, the truss members are rigidly connected together and held against relative movement on the shafts 27 and 29; also, the shafts 27, 29, are tied or connected together as a unit so that the set of rolls 11'—11"—91—91 may be removed from the adjacent standards as a unit, upon the removal of the cap plates 37, as shown in Fig. 16; also, the collars 109a being loose on the shafts 27, 29, permit the rolls 91 to accommodate themselves to the shaped blank while at the same time co-operate with the rolls 11'—11" to hold the blank in position as the latter moves between these rolls. 109x indicates shafts fitted at their opposite ends in recesses formed in the opposing faces of the truss members 109. Each shaft 109x is provided near its opposite ends with annuli which form seats for anti-friction bearings on which the adjacent roll 91 rotates.

The final set of rolls consist of lower and upper rolls 12'—12" and side rolls 114, which co-operate to bring in the side edges of the blank into abutting relation ready for welding and to size the shaped blank to the predetermined diameter. The set of rolls 12', 12", 114, are mounted similarly to the rolls 11', 11", 91, and the driven rolls 12', 12", are preferably similarly constructed and mounted on the adjacent shafts 27, 29, respectively, so that it will not be necessary to repeat such description.

116 indicates a pair of brackets suitably fixed to the outer end walls of the standards 30, 31, for the set of rolls 12', 12", 114. The brackets are provided with suitable bearings for a shaft 117 to which is secured a wire brush 118 disposed in line with the marginal edge portions of the shaped blank and adapted to scrape or brush therefrom scale and other matter to clean the surfaces ready for welding. The shaft 117 is driven by an electric motor 119.

The coupling 26 between each shaft 24 and the adjacent roll shaft 27 comprises the following (referring particularly to Figs. 17 to 21, inclusive): 120 indicates a plurality of recesses formed in the outer surface of the shafts 24 and 27 and extending inwardly from their ends those in one shaft being brought into registry with those in the other shaft when the shafts are to be connected to drive the roll shaft 27. These recesses are substantially V shaped in cross section as shown in Fig. 19, and form between them longitudinal guides or ribs 121, those recesses formed in one shaft (for example, shaft 24) being longer than those formed in the other shaft. 122 indicates a collar the inner walls of which are complementary to the recesses 120 and ribs 121, and permit the collar to slide laterally on to shaft 24, as shown in Fig. 17 (in which position the shafts are disconnected) or to slide into overlapping relation to both shafts, as shown in Fig. 18 (in which position the shafts are coupled or connected through the interlocking relation of the inner walls of the collar with the ribs 121 on both shafts) such movement being limited by the end walls of the recesses formed in the shaft 27. When the shafts 24, 27, are connected I insert in the exposed portions of the recesses formed in the shaft 24 suitable fillers 123, preferably formed of wood, which are wedged between the collar and end walls of the adjacent recesses and co-operate to prevent endwise movement of the collar. The fillers may be held in the recesses by a strap 123a or equivalent means.

124 indicates as an entirety means for removing from the interior of the blank at a plurality of points interiorly thereof, all scale and other foreign matter which are ground or broken off the interior of the blank due to the engagement of the bending rolls therewith and as a result of the forming and bending action involved, whereby the succeeding set of rolls may engage directly with the blank and danger of damage to the rolls is eliminated. This system comprises a power driven suction device within a casing 125 discharging into a receiver 125a and connected to a conduit 126 extending horizontally above the sets of rolls 2—2", 3'—3", 4'—4", 5'—5", 6'—6", 7'—7", 8'—8" and 9'—9", preferably midway between the standards 30, 31, as shown in Figs. 5 and 6. 127 indicates branch pipes, one thereof leading downwardly rearwardly of the above referred to sets of rolls, respectively, and into the interior of the blank, and each terminating in one or more intake nozzles 128, positioned rearwardly of the adjacent upper bending roll. The nozzles are arranged relatively close to the upper bending rolls, to be effective to suck in and withdraw the scale and other matter as it accumulates following the bending operations.

Each pipe 127 is supported by a collar 127a pivotally connected to a link 127b, which in turn is pivoted to a bracket 127c, the latter being secured to the adjacent standard 30 or 31.

Each suction nozzle comprises a casing 128a having a wire brush 128b mounted in it, the brush serving to engage the inner surface of the blank. The brush 128b is mounted in a holder 128c, the end walls of which are adjustably fixed to the end walls of the casing 128a by bolts 128d. 128' indicates a foot fixed to and extending rearwardly of the casing 128a. In case the metal of the blank flexes upwardly, the blank engages the foot and the latter raises the nozzle to prevent breakage of the latter. For this purpose, the intermediate sections 127x of the exhaust conduits are formed of flexible hose.

Fig. 44 illustrates a side elevation of a portion of an apparatus which forms a continuation of the machine as shown in Figs. 1 and 1a when it is desired to weld the joint between the side edges of the blank to completely form the pipes or cylinders; Figs. 1, 1a and 44 together illustrate a complete forming and welding apparatus, the base 129 (Fig. 44) being connected by a channel member 130 to the base 12. In this form of construction I provide a suitable welding apparatus indicated as an entirety at 131, sets of rolls 132, 133, in front and rear of the welding apparatus, and a set of straightening rolls 134 rearward of the set of rolls 133 and one or more, preferably two sets of sizing rolls 135, 136, rearwardly of the straightening rolls. The sets of rolls 132, 133, 135 and 136 may be mounted similarly to the sets of rolls 11'—11"—91 and 12'—12"—114. The sizing rolls may be arranged in front of the straightening rolls, when desired.

The upper and lower rolls of the sets 132, 133, 135 and 136 and the upper roll of the set 134 are preferably respectively driven by mechanisms similar to that herein disclosed for driving each set of bending and sizing rolls already described; but illustrations of such mechanisms are omitted as not being necessary to an understanding of my improved apparatus and process; also, each set of rolls 132, 133, 135 and 136 is similar in construction and similarly mounted and connected as a unit as are the sets of rolls 11'—11"—91, 12'—12"—114, respectively, except that the upper roll 132a of the set 132 is provided with an annular rib 132b the purpose of which will later appear. The sets of rolls 132, 133, 134, 135 and 136 are mounted on bases 132', 133', 134', 135', 136', respectively, carrying standards 30', 31', and the standards on one base are connected to the standards on adjacent bases by channels 137. The rolls constituting the set 132 are related to allow the side walls of the formed blank after leaving the sizing rolls 12 to spring outwardly slightly due to the inherent resiliency of the metal to effect a separation of the side edges a' thereof. This spring back is provided for for two reasons, namely, to permit the annular rib 132b to enter the space between the side edges of the blank, as shown in Fig. 46, whereby the rib may serve as a guide for the formed blank as it moves through the welding apparatus to relate the edges of the blank to the current supply brushes of the welding apparatus and also to maintain the edges a' separated to prevent heating thereof or formation of an electric arc between them before the progressive portions of the blank reach and pass through the welding apparatus and hence concentrate the flow of current across the edges between the brush conductors of the welding apparatus.

The welding apparatus 131 is preferably of the resistance type and comprises a pair of spaced members 138 suitably secured to brackets 139, the latter being fixed to the adjacent channel 137. These members 138 are supported between the sets of rolls 132 and 133 and are formed with aligned openings 140, through which the formed pipes or cylinders are fed, the openings being somewhat larger than the outside diameter of pipes. Each member is formed with a plurality of recesses 141 extending radially outwardly from the opening 140. Two of the recesses 141 are disposed at opposite sides of the space between the side edges a' and have mounted in them slides 142 carrying thrust rollers 143 which engage the outer wall of the pipe and each alternate recess 141 around the opening 140 is provided with slides 142 carrying between bifurcations on their outer ends rollers 143, these rollers 143 in one member 138 and the rollers 143 in the other member 138 serving to move the edges a' together as the progressive portions of the pipe feed through the members 138. Each slide 142 is threaded to receive a threaded screw 142a which extends through a suitable opening formed in member 138 and extending from the bottom of the adjacent recess 141 to the outer wall of the member. At its outer end the screw is fixed to a worm gear 142b in mesh with a worm 142c the shaft of which carries a hand wheel 142d. By turning the hand wheels, the rollers 143 can be adjusted toward or from the pipe A whereby they may cooperate with each other to compress the edges a' together. Each of the remaining recesses 141 in each member 138 receives and supports a block 144 provided with current supply brushes 145 of suitable construction, which brushes engage or have contact with the walls of the pipe to permit flow of the current from the brushes on one side thereof to the brushes on the other side of the pipe, the resistance between the edges a' serving to heat the metal thereof and effect their welding. The set of rolls 133 cooperates with the sets of rollers 143 to maintain the pipe edges a' together while welding takes place and during cooling of the welded joint. From the set of rolls 133 the pipe passes to and between the straightening rolls 134 comprising an upper driven roll 134a and two spaced idler rolls 134b, the latter being mounted in any desired manner. From the straightening rolls 134 the pipe passes to and between the final sets of sizing rolls 135, 136, thereby completing the manufacture of the pipe ready for use.

To those skilled in the art to which my invention relates, many changes in construction and widely differing embodiments and applications of the invention will suggest themselves without departing from the spirit and scope thereof. The disclosures and the description herein are purely illustrative and are not intended to be in any sense limiting.

What I claim is:

1. The herein disclosed process of shaping metal blanks into cylindrical form which consists in feeding a metal blank to and through a plurality of passes and first conditioning and finishing the opposite longitudinal side edges of the blank, then in simultaneously bending the opposite outer side portions of the blank on longitudinal lines to curve said portions on predetermined radii and permitting spring-back of the curved portions to larger radii following the bending thereof, respectively to larger radii, then in bending progressively inwardly increments of the blank on longitudinal lines into curved shape on radii equal to said first mentioned predetermined radii and permitting spring back of the curved increments following the bending thereof, respectively, to said larger radii, and finally bending the central longitudinal portion of the blank.

2. The herein disclosed process of shaping relatively thick metal blanks into substantially cylindrical form which consists in simultaneously bending the opposite outer side portions of the blank on longitudinal lines to curve said portions on predetermined equal radii and permitting spring-back of the curved portions to larger radii following the curving thereof, and then bending progressively inwardly increments of the blank on longitudinal lines into curved shape on radii equal to said predetermined radii and permitting spring back of the curved increments following the bending thereof, respectively, to equal but larger radii, and finally bending the central longitudinal portion of the blank on a radius substantially equal to said larger radii.

3. In apparatus of the class described, the combination of a support, standards on said support, sets of rolls rotatably mounted in said standards and between which a metal blank is passed, said sets of rolls operating to successively bend progressive portions of the blank from its opposite sides inwardly into curved form, and a pair of rolls disposed at opposite sides of one of said sets of rolls and substantially in the plane thereof for maintaining the curvature of the previously bent portions of the blank and for relieving pressure of the metal blank on the adjacent rolls.

4. In apparatus of the class described, the combination of a support, standards on said support, sets of rolls rotatably mounted in said standards and between which a metal blank is passed, said sets of rolls engaging increments of the blank progressively inwardly from its opposite side edges to bend them on predetermined radii less than that of the finished product, separate rolls arranged adjacent certain of said sets of rolls and having radii substantially equal to the predetermined radius of the finished product for maintaining the curvature of the previously bent portions and for relieving pressure on the adjacent rolls, and means for pressing outwardly the bent portions of the blank to maintain them against said separate rolls.

5. In apparatus of the class described, the combination of a support, standards on said support, sets of rolls rotatably mounted in said standards and between which a metal blank is passed, said sets of rolls operating to successively bend progressive portions of the blank into curved form, and pairs of devices for holding and guiding the previously bent portions of the blank as the latter feeds between succeeding sets of rolls and for relieving pressure on the adjacent rolls, certain of said pairs of devices being mounted on certain of said standards at either side of and substantially in line with the adjacent respective sets of rolls, the last referred to pairs of devices being adjustable.

6. In apparatus of the class described, the combination of a support, standards on said support, sets of rolls rotatably mounted in said standards and between which a metal blank is passed, said sets of rolls being arranged to engage increments of a blank progressively inwardly from its opposite side edges and to curve them on radii less than that of the finished product, pairs of devices having radii substantially equal to the predetermined radius of the finished product co-operatively related to certain of said sets of rolls to permit spring back of the previously curved increments and relieve pressure on said rolls, and devices arranged to engage the previously bent portions of the blank to maintain them in engagement with said first mentioned pairs of devices.

7. In apparatus of the class described, the combination of a plurality of sets of rolls between which a metal blank is passed, said sets of rolls operating to bend increments of the blank progressively inwardly from its opposite side edges into curved form on radii less than the predetermined radius of the finished product, a support between one of said sets of rolls and the adjoining set of rolls, a pair of spindles supported at their lower ends on said support, rollers each having a radius equal to the radius of the finished product, mounted on said spindles and arranged to be engaged by the previously bent portions of the blank in the spring back thereof to maintain the curvature of such portions, and means for connecting the upper ends of said spindles together.

8. In apparatus of the class described, the combination of a plurality of sets of rolls between which a metal blank is passed, said sets of rolls operating to bend increments of the blank progressively inwardly from its opposite side edges into curved form on radii less than the predetermined radius of the finished product, a support between one of said sets of rolls and the adjoining sets of rolls, a pair of spindles supported at their lower ends on said support, rollers each having a radius substantially equal to the radius of the finished product, mounted on said spindles and arranged to be engaged by the previously bent portions of the blank in the spring back thereof to maintain the curvature of such portions, and means for connecting the upper ends of said spindles together, said means comprising a tie member, clamps adjustably fixed to said tie member and adjustable abutments between said clamps and said tie member.

9. In apparatus of the class described, the combination of a plurality of sets of rolls between which a metal blank is passed, said sets of rolls operating to bend increments of the blank progressively inwardly from its opposite side edges into curved form on radii less than the predetermined radius of the finished product, a support between one of said sets of rolls and the adjoining set of rolls, a pair of spindles supported at their lower ends on said support, rollers each having a radius equal to the radius of the finished product, mounted on said spindles and arranged to be engaged by the previously bent portions of the blank in the spring back thereof to maintain the curvature of such portions, means for connecting the upper ends of said spindles together, said means comprising a tie member, clamps adjustably fixed to said tie member and adjustable abutments between said clamps and said tie member, and means for adjusting each of said spindles on said support.

10. In apparatus of the class described, the combination of a plurality of sets of rolls between which a metal blank is passed, said sets of rolls operating to bend increments of the blank progressively inwardly from its opposite side edges into curved form on predetermined radii less than the radius of the finished product, and pairs of curvilinear devices for guiding and holding the bent portions of the blank in a predetermined relation as the latter feeds to and between succeeding sets of rolls, the curvature of said devices being on a radius larger than the radius for said rolls to permit a predetermined spring back of the metal of the blank.

11. In apparatus of the class described, the combination of a plurality of sets of rolls between which a metal blank is passed, said sets of rolls operating to bend increments of the blank progressively inwardly from its opposite side edges into curved form on predetermined radii less than the predetermined radius of the finished product, pairs of devices associated with certain of said sets of rolls and having radii substantially equal to the radius of the finished product, and pairs of devices for maintaining the curved increments of the blank against said first mentioned devices, and means for bending the central portion of the blank on substantially the radius of the finished product.

12. In apparatus of the class described, the combination of a support, standards on said support, sets of rolls rotatably mounted in said standards and between which a metal blank is passed, said sets of rolls operating to progressively bend portions of the blank into curved form, means for holding and guiding the bent portions of the blank as the blank feeds between succeeding sets of rolls, the last set of bending rolls comprising upper and lower horizontal shafts rotatably and removably mounted in the adjacent standards, rolls fixed to said shafts, vertical shafts supported by and between said first mentioned shafts and rolls on said vertical shafts engaging the side portions of the shaped blank, and means for driving said first mentioned shafts, said driving means having detachable elements.

13. In apparatus of the class described, the combination of a support, standards on said support, sets of rolls rotatably mounted in said standards and between which a metal blank is passed, said sets of rolls operating to progressively bend portions of the blank into curved form, and means for holding and guiding the bent portions of the blank as the blank feeds between succeeding sets of rolls, the last set of bending rolls comprising upper and lower horizontal shafts rotatably and removably supported in the adjacent standards, rolls fixed to said shafts pairs of truss members disposed on said shafts at opposite sides of said rolls, vertical shafts supported by and between said truss members in line with the axes of said rolls, rolls on said vertical shafts engaging the side portions of the shaped blank, rigid connections between said truss members, and means for driving said first mentioned shafts.

14. In apparatus of the class described, the combination of a support, standards on said support, sets of rolls rotatably mounted in said standards and between which a metal blank is passed, said sets of rolls operating to progressively bend portions of the blank into curved form, and means for holding and guiding the bent portions of the blank as the blank feeds between succeeding sets of rolls, the last set of bending rolls comprising upper and lower horizontal shafts rotatably and removably supported in the adjacent standards, rolls fixed to said shafts, pairs of truss members disposed on said shafts at opposite sides of said rolls, vertical shafts supported by and between said truss members in line with the axes of said rolls, rolls on said vertical shafts engaging the side portions of the shaped blank, rigid connections between each truss member and the other truss member of the pair and the adjacent truss member of the other pair thereof.

15. The herein disclosed process of shaping metal blanks into cylinders which consists in simultaneously bending successively inwardly from its opposite side edges increments of the blank on predetermined radii smaller than the radii of such increments in the finished cylinder and permitting spring back of the increments following the bending thereof and applying outward pressure on said curved increments to effect spring back thereof to radii substantially equal to the predetermined radius of the finished cylinder.

16. The herein disclosed process of shaping metal blanks into cylinders which consists in simultaneously bending successively inwardly from its opposite side edges increments of the blank on predetermined radii smaller than the radii of such increments in the finished cylinder and permitting spring back of the increments following the bending thereof and applying outward pressure on said curved increments to effect spring back thereof to radii substantially equal to the predetermined radius of the finished cylinder, and finally bending the longitudinal central portion of the blank to a curvature equal to the radius of the finished cylinder.

17. In apparatus of the class described, the combination of sets of rolls between which a blank is passed and arranged to engage increments thereof progressively inwardly from its opposite side edges to curve them on radii less than the radius of the finished product, the lower rolls of the rearward sets of rolls having lateral end portions the radii of which are substantially equal to the radius of the finished product, and pairs of rolls associated with certain of said rearward sets of rolls arranged to be engaged by the previously bent increments of the blank for relieving pressure on the lateral end portions of the adjacent lower rolls.

18. In apparatus of the class described, the combination of sets of rolls between which a blank is passed and arranged to engage increments thereof progressively inwardly from its opposite side edges to curve them on longitudinal lines on radii less than the radius of the finished product, the lower rolls of the rearward sets having lateral end portions extending beyond the adjacent upper rolls, said end portions having radii substantially equal to the predetermined radius of the finished product, and pairs of rolls each disposed in the plane of and at opposite sides of certain of the rearward sets of rolls and co-operating with the extended end portions of the lower rolls of said sets to maintain the curvature of the previously curved increments and relieve pressure on said end portions.

19. In apparatus for shaping metal blanks into cylinders, the combination of sets of rolls between which a blank is passed, the first set of rolls having co-operative end portions arranged to bend the opposite marginal portions of the blank into curved form on predetermined radii less than the radius of the finished cylinder, the succeeding sets of rolls having co-operative bending portions disposed in stepped relation and progressing toward the center of the blank to bend increments thereof progressively on said predetermined radii, pairs of devices associated with each succeeding set of rolls having radii substantially equal to the radius of the finished cylinder for maintaining the curvature of the previously bent portions while permitting spring back thereof, and means arranged beyond said sets of rolls for curving the central portion of the blank.

20. The herein disclosed process of shaping relatively thick metal blanks into substantially cylindrical form which consists in simultaneously bending the opposite outer side portions of the blank on longitudinal lines to curve said portions on predetermined equal radii and permitting spring back of the curved portions to larger substantially equal predetermined radii following the bending thereof, and then bending progressively inwardly increments of the blank on longitudinal lines into curved shape on radii equal to said predetermined radii and permitting spring back of the curved increments following the bending thereof, respectively to said larger predetermined radii.

21. In apparatus for forming cylinders having a predetermined radius, the combination of a series of rolls through which a sheet metal blank is passed, the first set of rolls operating to simultaneously curve portions of the blank along or adjacent its opposite side edges on radii less than the predetermined radius of the formed cylinder, and the succeeding sets of rolls operating to respectively simultaneously curve oppositely related portions of the blank in progressive order toward the longitudinal center of the blank each on a radius less than the predetermined radius of the formed cylinder, means associated with certain of said succeeding sets of rolls for limiting the spring back of the previously curved portions to the predetermined radius of the formed cylinder, and rolls for curving the longitudinal central portion of the blank on the predetermined radius of the formed cylinder.

22. In apparatus of the class described, the combination of a support, standards on said support, sets of rolls rotatably mounted in said standards and between which a metal blank is passed, said sets of rolls operating to progressively bend portions of the blank into curved form, means for holding and guiding the bent portions of the blank as the blank feeds between succeeding sets of rolls, and a set of rolls comprising upper and lower horizontal shafts rotatably and removably supported in the adjacent standards, rolls fixed to said shafts, pairs of truss members disposed on said shafts at opposite sides of said rolls, vertical shafts supported by and between said truss members in line with the axes of said rolls, rolls on said vertical shafts engaging the side portions of the shaped blank and substantially rigid connections between each truss member and the other truss member of the pair and the adjacent truss member of the other pair thereof.

CARL M. YODER.